US011306772B2

(12) United States Patent
Omori

(10) Patent No.: US 11,306,772 B2
(45) Date of Patent: Apr. 19, 2022

(54) RADIAL FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

(*) Notice: Subject to any disclaimer, the term of this patent is extended or adjusted under 35 U.S.C. 154(b) by 0 days.

(21) Appl. No.: 17/011,269

(22) Filed: Sep. 3, 2020

(65) Prior Publication Data
US 2021/0010531 A1 Jan. 14, 2021

Related U.S. Application Data

(63) Continuation of application No. PCT/JP2019/009119, filed on Mar. 7, 2019.

(30) Foreign Application Priority Data

Mar. 7, 2018 (JP) .............................. JP2018-040772

(51) Int. Cl.
F16C 17/02 (2006.01)
F16C 27/02 (2006.01)

(52) U.S. Cl.
CPC ............ *F16C 17/024* (2013.01); *F16C 27/02* (2013.01); *F16C 2360/24* (2013.01)

(58) Field of Classification Search
CPC ..... F16C 17/024; F16C 27/02; F16C 2360/24
See application file for complete search history.

(56) References Cited

U.S. PATENT DOCUMENTS

| 3,884,534 A * | 5/1975 | Winn .................... F16C 17/024 384/106 |
| 4,274,683 A * | 6/1981 | Gray .................... F16C 17/024 384/106 |
| 4,465,384 A * | 8/1984 | Heshmat ............... F16C 17/024 384/106 |
| 5,902,049 A | 5/1999 | Heshmat |
| 5,915,841 A | 6/1999 | Weissert |
| 5,988,885 A | 11/1999 | Heshmat |
| 9,388,848 B2 | 7/2016 | Larsen et al. |
| 10,385,915 B2 * | 8/2019 | Himmelmann ....... F04D 25/045 |
| 2004/0179759 A1 | 9/2004 | Katou et al. |
| 2010/0177997 A1 | 7/2010 | Lee |
| 2011/0103725 A1* | 5/2011 | Omori .................... F16C 33/14 384/276 |
| 2011/0211783 A1* | 9/2011 | Ishimoto ............... F16C 17/024 384/440 |
| 2014/0241653 A1* | 8/2014 | Omori .................... F16C 43/02 384/106 |

(Continued)

FOREIGN PATENT DOCUMENTS

CN 101821519 A 9/2010
CN 101839281 A 9/2010

(Continued)

Primary Examiner — Alan B Waits

(57) ABSTRACT

A radial foil bearing includes a bearing housing that has an insertion hole into which a shaft is inserted, a back foil that is disposed on an inner peripheral surface of the insertion hole, a top foil that is supported by the back foil, and a protrusion portion that protrudes toward an inner side in a radial direction of the insertion hole from the inner peripheral surface of the insertion hole and is configured to allow supporting of the top foil.

17 Claims, 16 Drawing Sheets

(56) References Cited

U.S. PATENT DOCUMENTS

| | | | | |
|---|---|---|---|---|
| 2015/0030269 A1* | 1/2015 | Omori | ................... | F16C 43/02 |
| | | | | 384/103 |
| 2015/0233415 A1 | 8/2015 | Larsen et al. | | |
| 2016/0333927 A1* | 11/2016 | Rimpel | ................ | F16C 17/024 |
| 2016/0348714 A1* | 12/2016 | Omori | ................... | F16C 27/02 |
| 2020/0224713 A1* | 7/2020 | Omori | ................. | F16C 17/024 |

FOREIGN PATENT DOCUMENTS

| | | |
|---|---|---|
| CN | 104603480 A | 5/2015 |
| EP | 2 778 448 A1 | 9/2014 |
| JP | H11-247844 A | 9/1999 |
| JP | 2004-190761 A | 7/2004 |
| JP | 2004-270904 A | 9/2004 |
| JP | 2006-057652 A | 3/2006 |
| JP | 2009-216239 A | 9/2009 |
| JP | 2009-299748 A | 12/2009 |
| JP | 2013-100885 A | 5/2013 |
| KR | 10-2010-0045253 A | 5/2010 |
| WO | 2006/018916 A1 | 2/2006 |
| WO | 2013/069682 A1 | 5/2013 |

\* cited by examiner

RADIAL FOIL BEARING

TECHNICAL FIELD

The present disclosure relates to a radial foil bearing.

This application is a Continuation Application based on international Application No. PCT/JP2019/009119, filed on Mar. 7, 2019, which claims priority on, Japanese Patent Application No. 2018-040772, filed on Mar. 7, 2018, the contents of which are incorporated herein by reference.

BACKGROUND ART

In the related art, a radial foil bearing that is disposed and used outside a rotary shall is known as a bearing for a high-speed rotating body. As such a radial foil bearing, a configuration including a thin plate-shaped top foil that forms a bearing surface, a back foil that elastically supports the top foil, and a cylindrical bearing housing that houses the top foil and the back foil is well known. As the hack foil of the radial foil bearing, a bump foil obtained by forming a thin plate into a corrugated plate shape is mainly used (for example, refer to Patent Document 1 below). Patent Documents 2 to 4 each disclose a radial foil bearing using a back foil.

CITATION LIST

Patent Document

[Patent Document 1]
Japanese Unexamined Patent Application, First Publication No. 2013-100885
[Patent Document 2]
Japanese Unexamined Patent Application, First Publication No. 2006-57652
[Patent Document 3]
Japanese Unexamined Patent Application, First Publication No. 2004-270904
[Patent Document 4]
Japanese Unexamined Patent Application, First Publication No. 2009-299748

SUMMARY OF THE INVENTION

Technical Problem

In such a radial toil bearing, since the inside of the bearing housing is configured by a soft foil, the displacement of the shaft with respect to an external force is large. Therefore, even when a device on which the radial foil bearing is mounted is exposed to strong disturbance, it is necessary to suppress the displacement of the shaft such that the shaft does come into contact with a device main body (stationary portion).

The present disclosure is devised in view of the circumstances, and an object thereof is to suppress the displacement of the shaft when a large external force acts on the device.

Solution to Problem

According to a first aspect of the radial foil bearing of the present disclose there is provided a radial foil bearing including a bearing housing that has an insertion hole into which a shaft is inserted, a back foil that is disposed on an inner peripheral surface of the insertion hole, a top foil that is supported by the back foil, and a protrusion portion that protrudes radially inside the insertion hole from the inner peripheral surface of the insertion hole and is configured to allow supporting of the top foil.

According to a second aspect of the radial foil bearing of the present disclosure, in the radial foil bearing of the first aspect, the back foil may include a hole portion to which the protrusion portion is fitted.

According to a third aspect of the radial foil bearing of the present disclosure, in the radial foil hearing of the first or second aspect, the protrusion portion may include a top wall portion at a position in an axial direction within a range of ±5% from a middle position in the axial direction of the insertion hole.

According to a fourth aspect of the radial foil bearing of the present disclosure, in the radial foil bearing of any one of the first to third aspects, the protrusion portion may be formed in a ring shape along a circumferential direction of the inner peripheral surface of the insertion hole.

According to a fifth aspect of the radial foil bearing of the present disclosure, in the radial foil bearing of any one of the first to third aspects, a plurality of the protrusion portions may be formed with a gap along a circumferential direction of the inner peripheral surface of the insertion hole.

According to a sixth aspect of the radial foil bearing of the present disclosure, in the radial foil bearing of any one of the first to fifth aspects, the back foil may include a first back foil and a second back foil, which are separated in an axial direction of the insertion hole. The first back foil and the second back foil may face each other in the axial direction with the protrusion portion interposed therebetween.

According to a seventh aspect of the radial foil bearing of the present disclosure, in the radial foil bearing of the sixth aspect, the first back foil and the second back foil may have different support stiffness for supporting the top foil.

According to an eighth aspect of the radial foil bearing of the present disclosure, in the radial foil bearing of the fifth aspect, the back foil may include a first support portion that is disposed on a first side in an axial direction with respect to the protrusion portions, a second support portion that is disposed on a second side in the axial direction with respect to the protrusion portions, and a connecting portion that is disposed in the gap between the protrusion portion and the protrusion portion and connects the first support portion and the second support portion to each other.

In the present disclosure, the displacement of the shaft can be suppressed when a large external force acts on the device.

DESCRIPTION OF THE EMBODIMENTS

Hereinafter, a radial foil bearing of the present disclosure will be described in detail with reference to the drawings.

Figure 1:
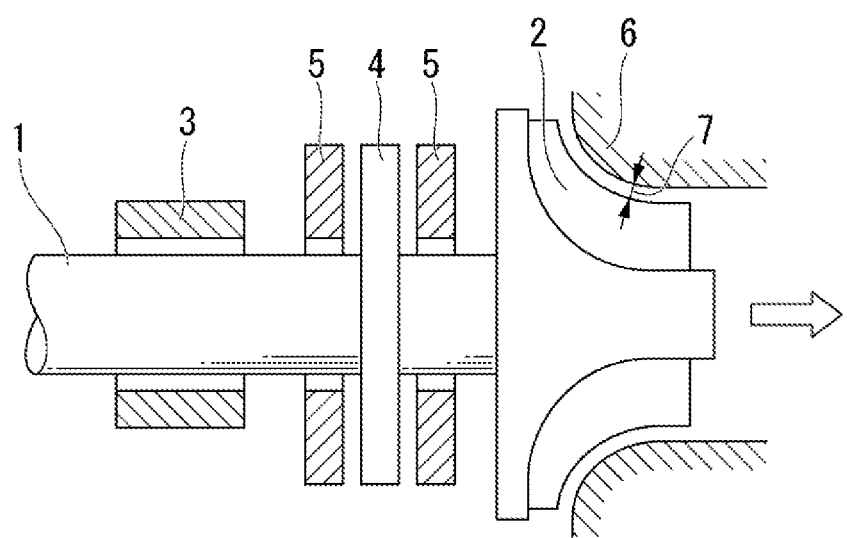
FIG. 1 is a side view illustrating an example of a turbomachine to which a radial foil bearing of the present disclosure is applied.

FIG. 1 is a side view illustrating an example of a turbomachine to which the radial foil bearing of the present disclosure is applied.

In FIG. 1, the reference sign 1 indicates a rotary shaft (shaft), the reference sign 2 indicates an impeller provided at a tip of the rotary shaft on a first side in an axial direction, and the reference sign 3 indicates the radial foil bearing according to the present disclosure. Although only one radial foil bearing is illustrated in FIG. 1 for the sake of simplicity, normally two radial foil bearings are provided in the axial direction of the rotary shaft 1. Therefore, two radial foil bearings 3 are provided also in the present disclosure.

The radial foil bearing 3 is disposed outside the rotary shaft 1. A thrust collar 4 is provided between the impeller 2 of the rotary shaft 1 and the radial foil bearing 3. Thrust bearings 5 are disposed (inserted) on both sides of the thrust collar 4 in the axial direction. The impeller 2 is disposed in a housing 6, which is a stationary portion, and a tip clearance 7 is provided between the housing 6 and the impeller 2.

First Embodiment

Figure 2:
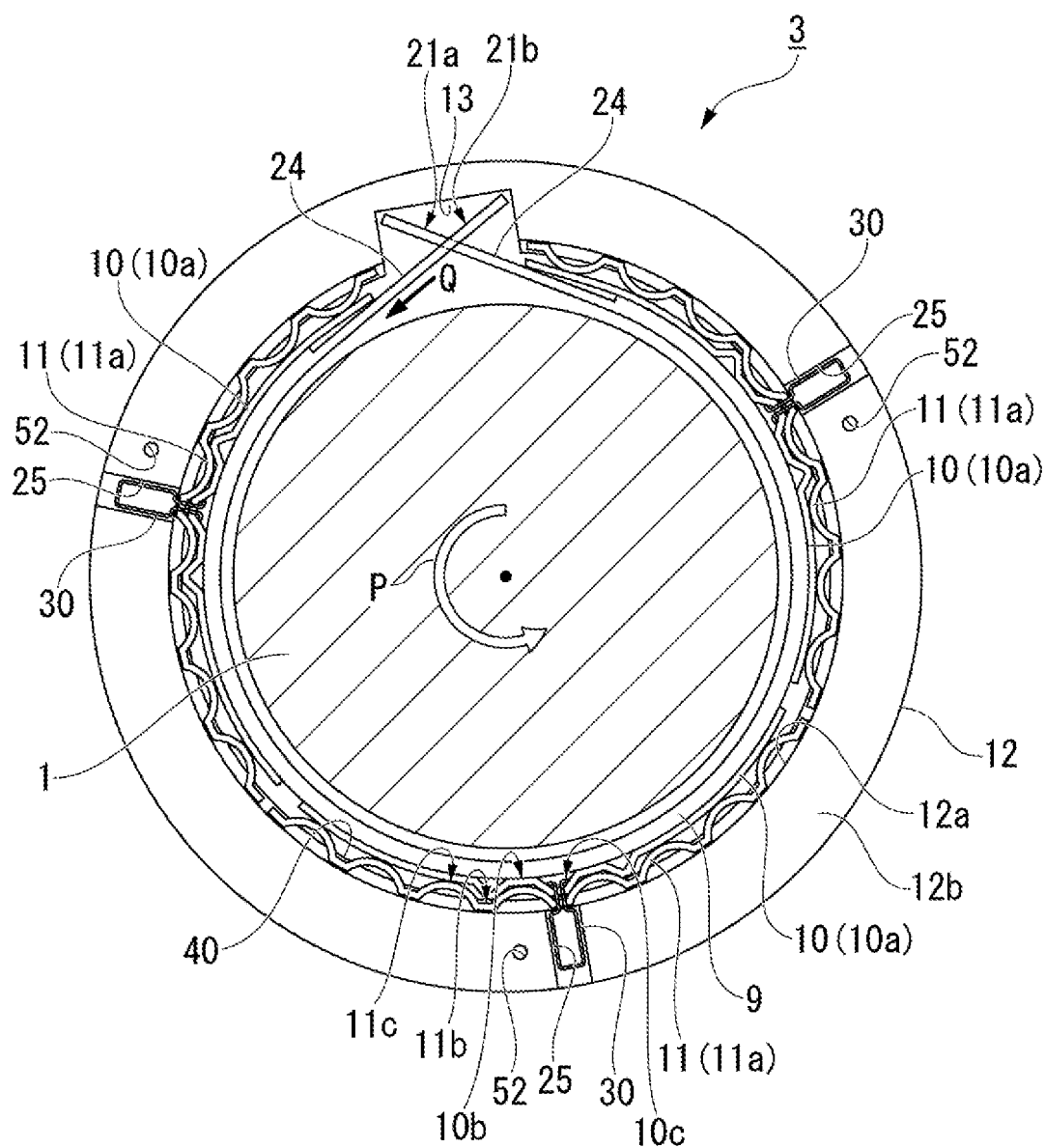
FIG. 2 is a front view illustrating a radial foil bearing according to a first embodiment of the present disclosure.
Figure 3:
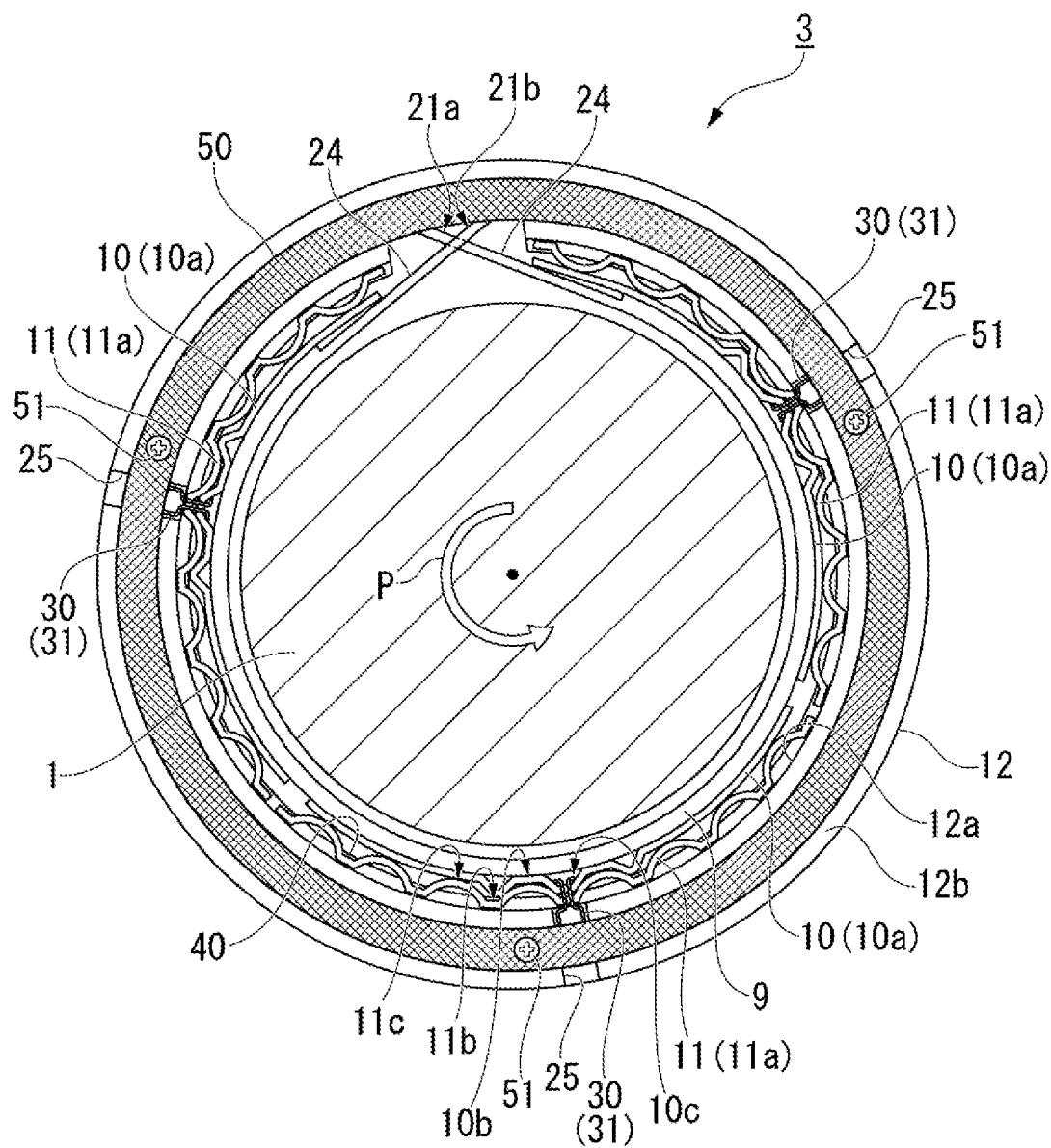
FIG. 3 is a front view illustrating a state where a lid body is attached to the radial foil bearing according to the first embodiment of the present disclosure.

FIG. 2 is a front view illustrating the radial foil bearing 3 according to a first embodiment of the present disclosure. FIG. 3 is a front view illustrating a state where a lid body 50 is attached to the radial foil bearing 3 according to the first embodiment of the present disclosure.

The radial foil bearing 3 is a bearing that is disposed outside the rotary shaft 1 and supports the rotary shaft 1. The radial foil bearing 3 includes a top foil 9, an intermediate foil 10, a back foil 11, and a bearing housing 12. The bearing housing 12 has an insertion hole 12a through which the rotary shaft 1 is inserted.

In the following description, a positional relationship between respective members may be described with the insertion hole 12a as reference. Specifically, the "axial direction" refers to a direction in which the insertion hole 12a extends (a direction which the rotary shaft 1 is inserted). In addition, a "radial direction" refers to a radial direction of the insertion hole 12a. In addition, a "circumferential direction" refers to a circumferential direction along an inner peripheral surface of the insertion hole 12a.

The bearing housing 12 is a cylindrical member that configures an outermost portion of the radial foil bearing 3 in the radial direction. The insertion hole 12a is formed in the bearing housing 12. The back foil 11, the intermediate foil 10, and the top foil 9 are housed in the insertion hole 12a. Specifically, the back foil 11 is supported by the inner peripheral surface of the insertion hole 12a. The intermediate foil 10 is supported by the back foil 11. The top foil 9 is supported by the intermediate foil 10. The bearing housing 12 of the present disclosure is a cylindrical member including the insertion hole 12a. However, the bearing housing 12 may be a member having other than a cylindrical shape (for example, a prismatic member) insofar as the bearing housing 12 has the insertion bole 12a.

Figure 4A:
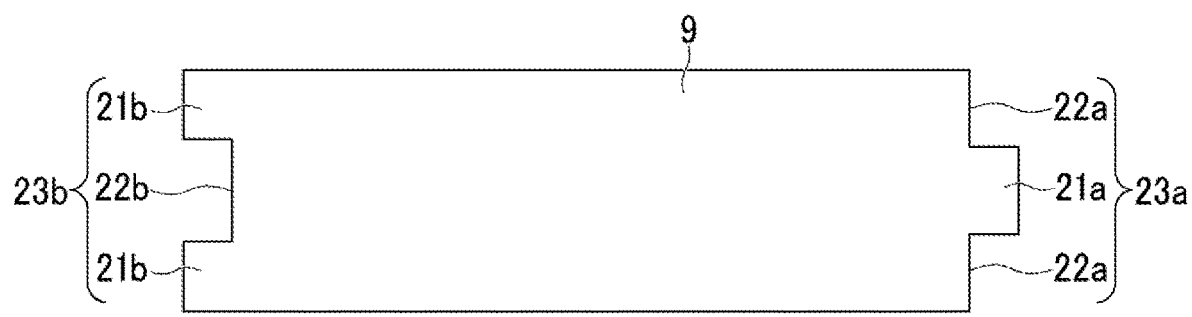
FIG. 4A is an unfolded plan view of a top foil according to the first embodiment of the present disclosure.
Figure 4B:
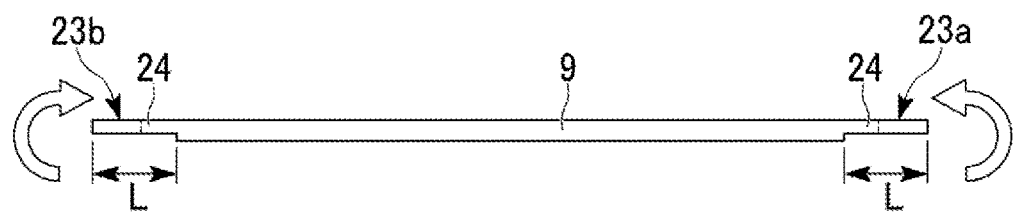
FIG. 4B is an unfolded front view of the top foil according to the first embodiment of the present disclosure.

FIG. 4A is an unfolded plan view of the top foil 9 according to the first embodiment of the present disclosure. FIG. 4B is an unfolded front view of the top foil 9 according to the first embodiment of the present disclosure.

As illustrated in FIG. 4A, the top foil 9 is a rectangular metal foil having a long side in the circumferential direction and a short side in the axial direction. As illustrated in FIG. 2, the top foil 9 is wound in a cylindrical shape and is disposed to face a peripheral surface of the rotary shaft 1.

As illustrated in FIG. 4A, on a first short side of the top foil 9 in a long side direction, a first uneven portion 23a having one protruding portion 21a protruding to a first side in the long side direction and two recessed portions 22a formed on both sides of the protruding portion 21a in a short side direction is formed. That is, the first short side of the top foil 9 in the long side direction includes one protruding portion 21a protruding to the first side in the long side direction and a step connected to both sides of the protruding portion 21a in the short side direction.

In addition, on a second short side (a short side positioned on a second side in the long side direction) which is opposite to the first short side of the top foil 9, a second uneven portion 23b having two protruding portions 21b spaced apart from each other in the short side direction and one recessed portion 22b positioned between the two protruding portions 21b is formed. Alternatively, on the short side of the top foil 9 positioned on the second side in the long side direction, the recessed portion 22b recessed to the first side in the long side direction and steps positioned on both sides of the recessed portion 22b in the short side direction are provided.

The recessed portion 22b of the second uneven portion 23b is formed to correspond to the protruding portion 21a of the first uneven portion 23a. In addition, the recessed portions 22a of the first uneven portion 23a are formed to correspond to the protruding portions 21b of the second uneven portion 23b. That is, a minimum width (interval) of the recessed portion 22b in the short side direction is larger than a maximum width of the protruding portion 21a in the short side direction. The length (interval) of the recessed portion 22b in the long side direction and the length (interval) of the protruding portion 21a in the long side direction of the present disclosure are the same in the long side direction.

When the top foil 9 is wound in a cylindrical shape such that the first uneven portion 23a and the second uneven portion 23b overlap each other, the recessed portion 22b of the second uneven portion 23b is formed such that the protruding portion 21a passes through the recessed portion 22b. Similarly, when the top foil 9 is wound in a cylindrical shape, the recessed portions 22a of the first uneven portion 23a are formed such that the protruding portions 21b pass through the recessed portions 22a respectively.

The protruding portions 21a and 21b that have passed through the recessed portions 22b and 22a are respectively extracted to a bearing housing 12 side, as illustrated in FIG. 2. That is, when the top foil 9 disposed on an inner peripheral side of the insertion hole 12a is seen from the axial direction, the protruding portion 21a and the protruding portions 21b intersect each other. In addition, the protruding portion 21a of the top foil 9 is positioned between the two protruding portions 21b in the axial direction. A groove 13 which houses the protruding portions 21a and 21b is formed in the inner peripheral surface of the insertion hole 12a of the bearing housing 12. The groove 13 is formed from a first end surface 12b to a second end surface 12b of the bearing housing 12 in the axial direction.

As illustrated in FIG. 4B, on a side where the first uneven portion 23a is formed (the side of the first short side) and a side where the second uneven portion 23b is formed (the side of the second short side), thin wall portions 24, each of which has a small thickness (thin wall) compared to a middle portion therebetween, are formed in the top foil 9. As illustrated in FIG. 2, the thin wall portions 24 are recessed as an outer peripheral surface (a surface on the bearing housing 12 side) of each of the thin wall portions 24 becomes thinner than an outer peripheral surface of the middle portion. As illustrated in FIG. 2, a length L of the thin wall portion 24 in the circumferential direction is set to a length corresponding to the groove 13 and one crest portion 11c at an end portion of the back foil 11. In the present disclosure, the top foil 9 disposed in the bearing housing 12 includes a step on the outer peripheral surface side and becomes thin via the step. In addition, the thin wall portions 24 extend from both ends of the top foil 9 in the circumferential direction to circumferential positions beyond the closest crest portions 11c.

As illustrated in FIG. 2, a pair of engaging grooves 25 extending toward the outer side in the radial direction from an inner peripheral edge of the insertion hole 12a is formed in both of the end surfaces 12b of the bearing housing 12 in the axial direction. That is, the end surface 12b of the bearing housing 12 in the axial direction includes a recessed portion extending to an inner periphery of the bearing housing 12. Each engaging groove 25 of the present disclosure is formed at a position where the end surface 12b of the bearing housing 12 is almost divided in three in the circumferential direction. Engagement members 30 (engagement pins) to be described later are engaged with the engaging grooves 25 respectively. In the present disclosure, the groove 13 is disposed between two engaging grooves 25 out of the three engaging grooves 25. In addition, one of the engaging grooves 25 faces the groove 13 in the radial direction.

The back foil 11 is disposed along the inner peripheral surface of the insertion hole 12a of the bearing housing 12. The back foil 11 is a foil (thin plate) that elastically supports the intermediate foil 10 and the top foil 9. As such a back foil 11, for example, a bump foil, spring foils described in Patent Document 2 and Patent Document 3, and, a back foil described in Patent Document 4 are used. In the present disclosure, a bump foil is used as the back foil 11.

The back foil 11 of the present disclosure is configured by three back foil pieces disposed along the inner peripheral surface of the insertion hole 12a. Since the back foil pieces 11a are separated from each other in the axial direction as will be described later, in a strict sense, the back foil 11 is configured by six back foil pieces 11a. The back foil pieces 11a each have a foil (thin plate) that is corrugated in the circumferential direction. The three circumferentially connected back foil pieces are curved to have a substantially cylindrical shape as a whole when seen from the axial direction. That is, the back foil pieces 11a are supported along the inner peripheral surface of the insertion hole 12a. In the present disclosure, all of the three back foil pieces 11a connected in the circumferential direction are formed in the same shape and dimension. Therefore, the back foil pieces 11a are disposed by dividing, the inner peripheral surface of the insertion hole 12a into substantially three in the circumferential direction.

The back foil pieces 11a each are formed such that the crest portion 11c protruding to an inner side in the radial direction and a trough portion 11b protruding to an outer side in the radial direction when seen from the crest portion 11c alternate in the circumferential direction. A flat portion of the trough portion 11b facing the bearing housing 12 can come into contact with the inner peripheral surface of the insertion hole 12a.

In addition, the crest portion 11c can come into contact with the intermediate foil 10 (intermediate foil piece 10a). As described above, the back foil piece 11a elastically support by the crest portions 11c the top foil 9 via the intermediate foil piece 10a. Both ends of the back foil piece 11a in the circumferential direction are the trough portions 11b.

The intermediate foil 10 is disposed between the top foil 9 and the back foil 11. In the present disclosure, the intermediate foil 10 is configured by three intermediate foil pieces 10a disposed along the inner peripheral surface of the insertion hole 12a. Since the intermediate foil pieces 10a are separated from each other in the axial direction as will be described later, in a strict sense, the intermediate foil 10 is configured by six intermediate foil pieces 10a. The three intermediate foil pieces 10a connected in the circumferential direction each have a substantially rectangular unfolded shape, and are curved in a substantially cylindrical shape as a whole when seen from the axial direction, as illustrated in FIG. 2. In the present disclosure, all of the three intermediate foil pieces 10a connected in the circumferential direction are formed in the same shape and dimension. Therefore, the intermediate foil pieces 10a are disposed by dividing the inner peripheral surface of the insertion hole 12a into substantially three in the circumferential direction.

The thickness of the intermediate foil piece 10a is smaller than the back foil piece 11a. The stiffness of the intermediate foil 10 is equal to or lower than half the stiffness of the back foil 11. The outer shape of the intermediate foil piece 10a has substantially the same size as the outer shape of the back foil piece 11a. The intermediate foil piece 10a has a flat surface portion 10b that is in contact with a top portion of the crest portion 11c of the back foil 11 and a groove portion 10c that is recessed (protruding) to the outer side in the radial direction than the flat surface portion 10b. That is, the groove portion 10c is spaced apart from the top foil 9, and the flat surface portion 10b is in contact with the top foil 9. The groove portion 10c is formed at least at a circumferential position between both ends of the intermediate foil piece 10a in the circumferential direction (a middle position of the intermediate foil piece 10a in the circumferential direction in the present disclosure). Parts on both sides of the groove portion 10c of the intermediate foil piece 10a can come into contact with the crest portions 11c on both sides of the trough portion 11b of the back foil piece 11a that faces the groove portion 10c.

Figure 5:
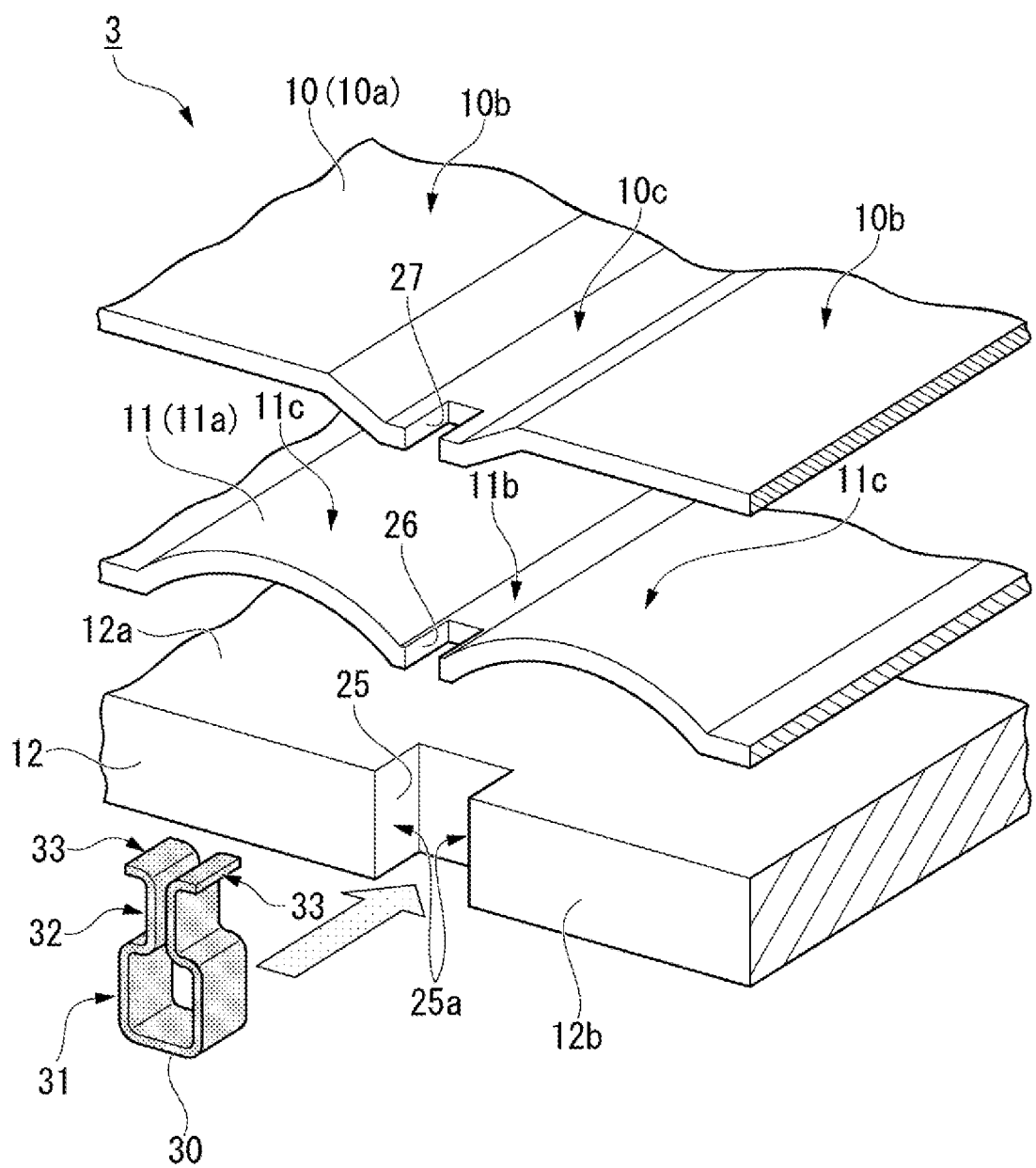
FIG. 5 is an exploded perspective view of main portions of the radial foil bearing according to the first embodiment of the present disclosure.
Figure 6A:
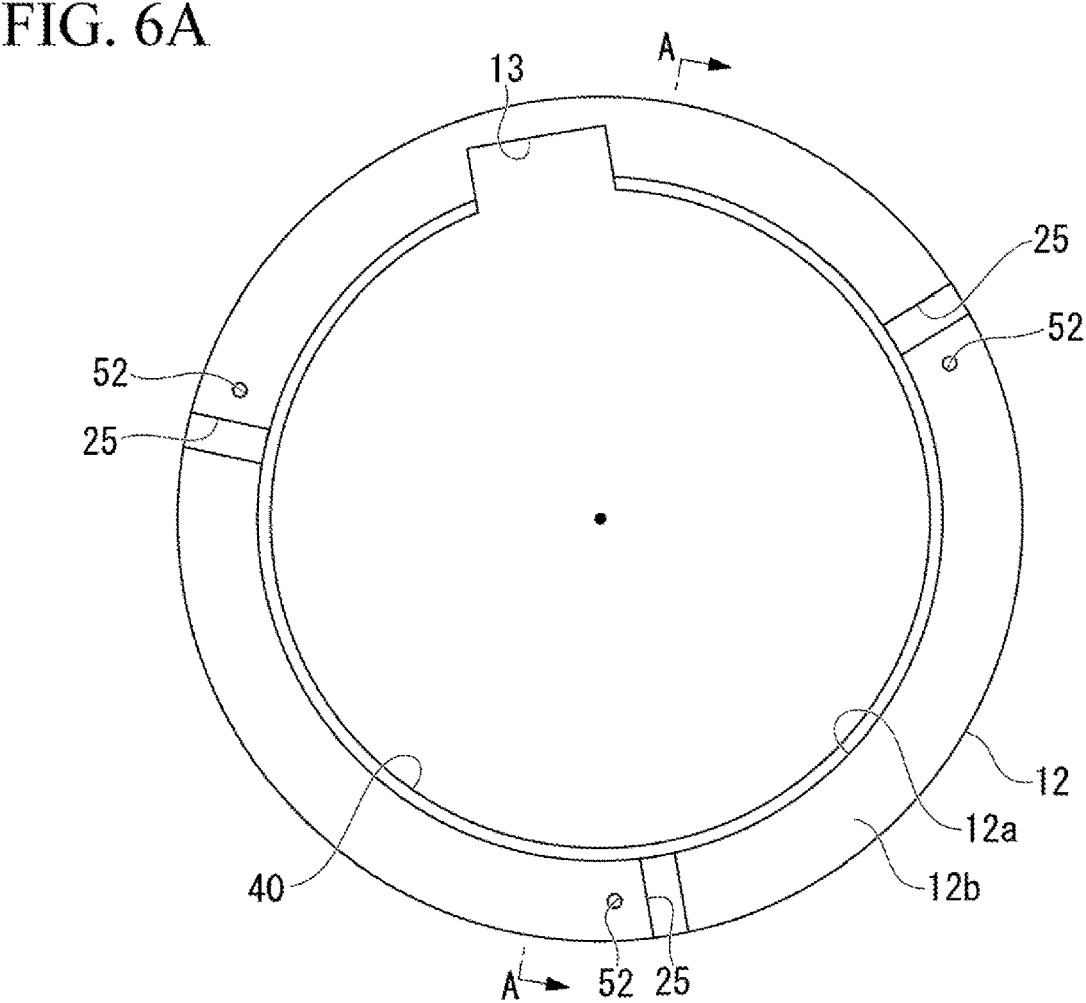
FIG. 6A is a front view of a bearing housing according to the first embodiment of the present disclosure.
Figure 6B:
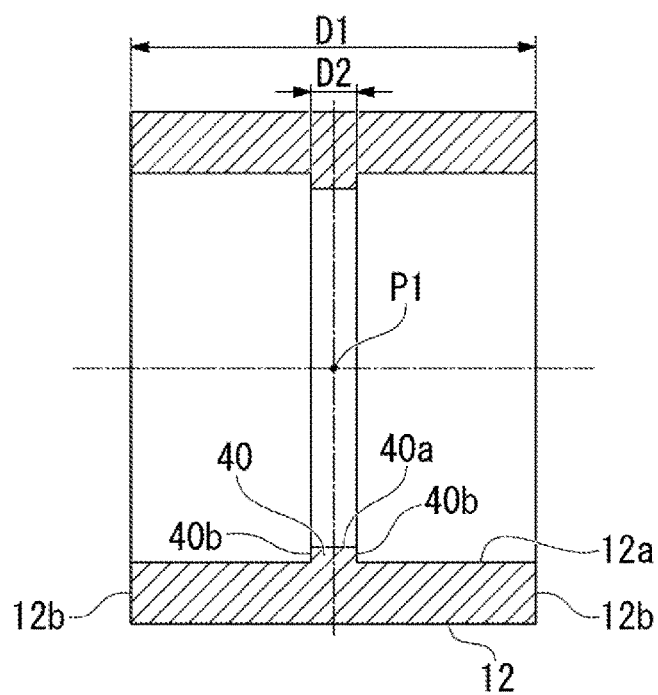
FIG. 6B is a sectional view of the bearing housing taken along A-A according to the first embodiment of the present disclosure.
Figure 7:
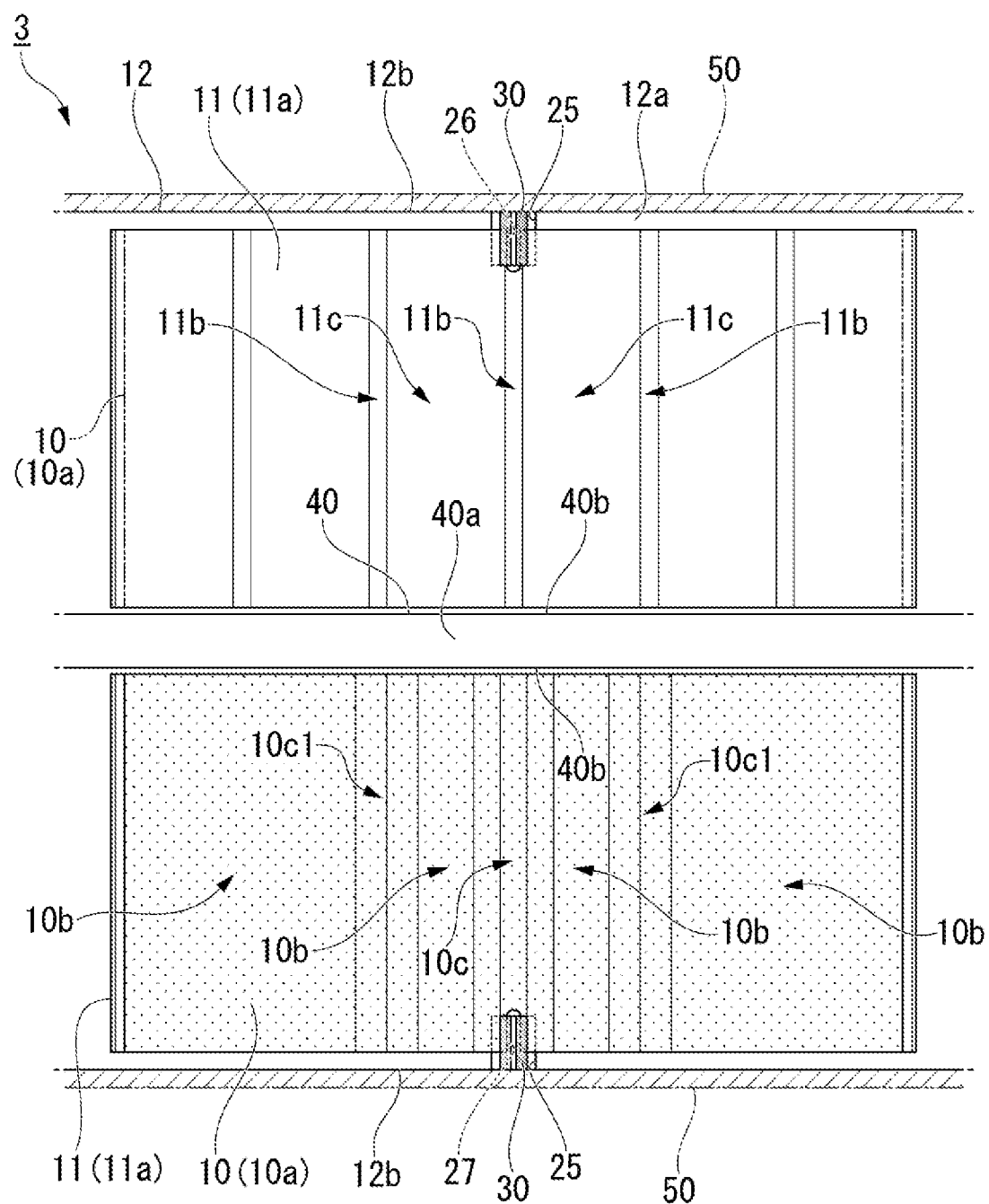
FIG. 7 is a plan view schematically illustrating the flattened main portions of the radial foil bearing according to the first embodiment of the present disclosure.
Figure 8:
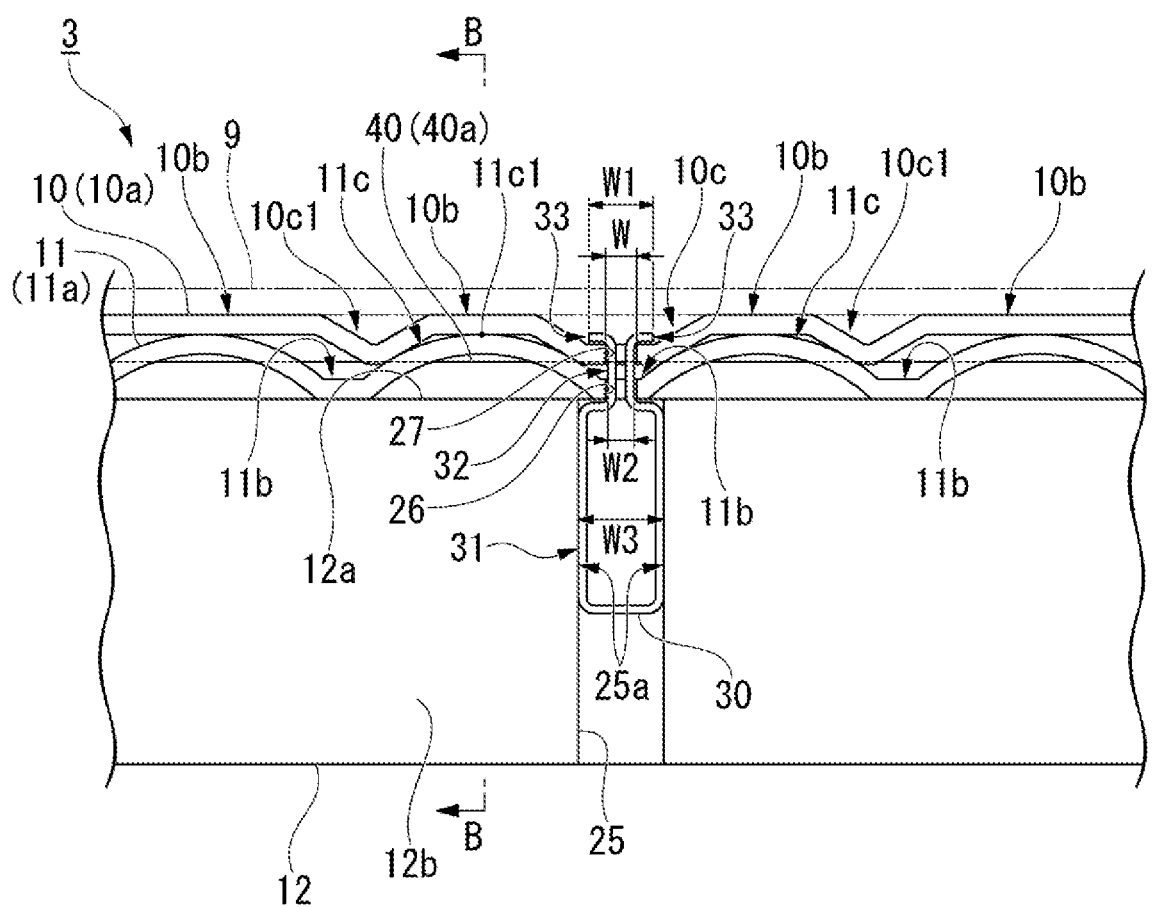
FIG. 8 is a front view schematically illustrating the flattened main portions of the radial foil bearing according to the first embodiment of the present disclosure.
Figure 9:
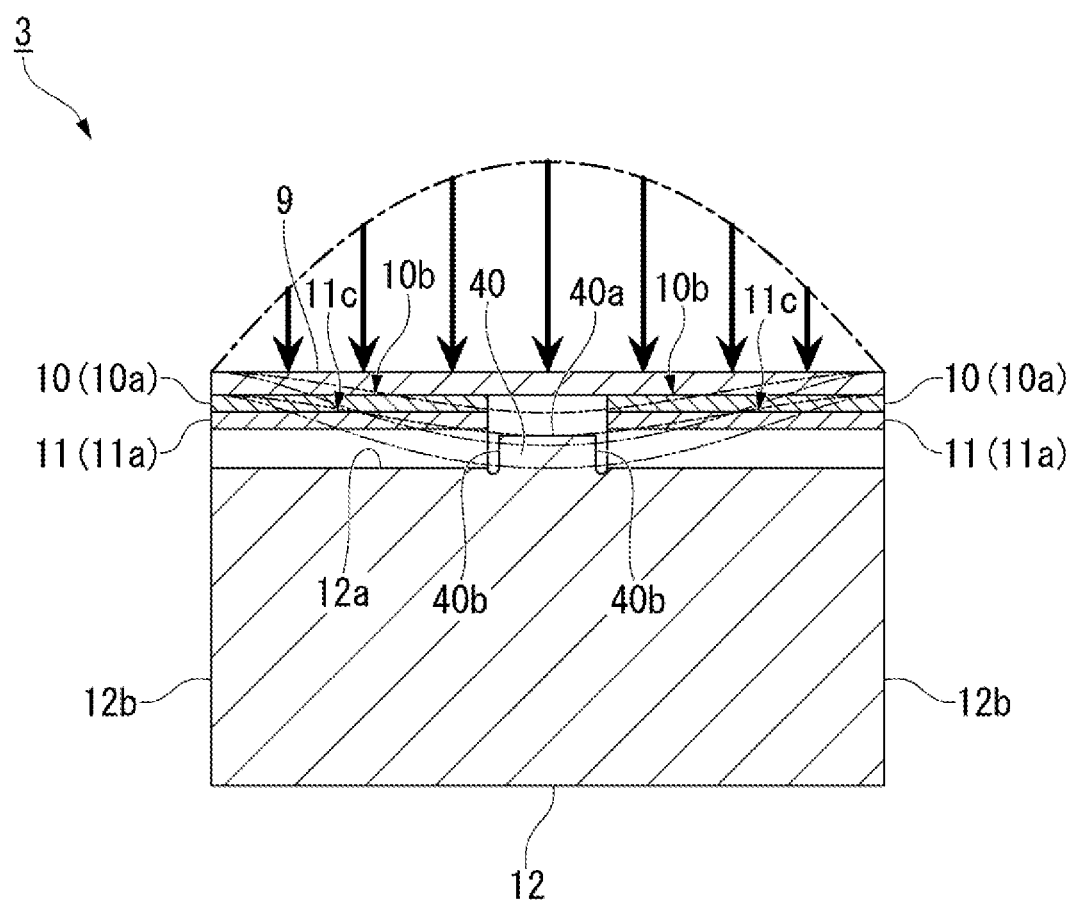
FIG. 9 is a sectional view taken along B-B in FIG. 8.

FIG. 5 is an exploded perspective view of main portions of the radial foil bearing 3 according to the first embodiment of the present disclosure. FIG. 6A is a front view of the bearing housing 12 according to the first embodiment of the present disclosure. FIG. 6B is a sectional view of the bearing housing 12 taken along A-A according to the first embodiment of the present disclosure. FIG. 7 is a plan view schematically illustrating flattened main portions of the radial foil bearing 3 according to the first embodiment of the present disclosure. FIG. 8 is a front view schematically illustrating the flattened main portions of the radial foil bearing 3 according to the first embodiment of the present disclosure. FIG. 9 is a sectional view taken along B-B in FIG. 8 (that is, a sectional view of the back foil piece 11a in a case where the top portion of the crest portion closest to the engaging groove 25 is included and is cut in the radial direction).

As illustrated in FIG. 5, the back foil piece 11a includes a notch 26 in an end edge in the axial direction. The notch 26 is formed in the trough portion 11b of the back foil piece 11a.

The notch 26 is formed at a circumferential position between both ends of the back foil piece 11a in the circumferential direction (a middle position of the back foil piece 11a in the circumferential direction in the present disclosure). In addition, the notch 26 is formed at a circumferential position between the two crest portions 11c formed in the back foil piece 11a. That is, the back foil piece 11a has a recess in the axial direction at the circumferential position of the end edge in the axial direction. The notch 26 is disposed at a position corresponding to the engaging groove 25 of the bearing housing 12, that is, a position overlapping (connected) the engaging groove 25 in the radial direction. In addition, the width of the notch 26 is formed to be smaller than the width of the engaging groove 25. That is, both ends of the notch 26 in the circumferential direction are positioned at circumferential positions between both ends of the engaging groove 25 in the circumferential direction.

In addition, the intermediate foil piece 10a includes a notch 27 in an end edge in the axial direction. The notch 27 is formed in the groove portion 10c of the intermediate foil piece 10a. The groove portion 10c of the present disclosure has a bottom portion that is positioned in the outer side in the radial direction than the flat surface portion 10b and is flat along the circumferential direction and tapered portions that are positioned at both ends of the bottom portion in the circumferential direction and extend in the inner side in the radial direction toward the flat surface portion 10b. The notch 27 is formed at a circumferential position between both ends of the intermediate foil piece 10a in the circumferential direction (a middle position of the intermediate foil piece 10a in the circumferential direction in the present disclosure). That is, the intermediate foil piece 10a has a recess in the axial direction at the circumferential position on both end edges in the axial direction.

The notch 27 is disposed at a position corresponding to the engaging groove 25 of the bearing housing 12 and the notch 26 of the back foil piece 11a, that is, a position overlapping (connected) the engaging groove 25 and the notch 26 in the radial direction. The width of the notch 27 is formed to be smaller than the width of the engaging groove 25, and to be the same as the width of the notch 26. The engagement member 30 is engaged with the engaging groove 25, the notch 26, and the notch 27. The engagement member 30 includes an engaging portion 31 that engages with the engaging groove 25 of the bearing housing 12, insertion portions 32 that are inserted (fitted) into the notch 26 and the notch 27, and barb portions 33 that face the inner peripheral side of the intermediate foil 10 (back foil 11).

As illustrated FIG. 8, the engaging portion 31 is in contact with inner surfaces 25a, which are both ends of the engaging groove 25 in the circumferential direction. The inner surfaces 25a of the engaging groove 25 face each other at an interval in the circumferential direction and extend parallel to each other in the radial direction. The engaging portion 31 is formed in a rectangular frame shape that is in contact with each of the inner surfaces 25a of the engaging groove 25 at a predetermined width in the radial direction. In addition, there is a region, which is a cavity in the circumferential direction, between a portion of the engaging portion 31 that faces the inner surface 25a on one side in the circumferential direction and a portion of the engaging portion 31 that faces the inner surface 25a on the other side in the circumferential direction. In addition, the engaging portion 31 is smoothly spaced apart from the inner surfaces 25a by forming an R shape (curved shape) or the like.

The insertion portions 32 extend in parallel to each other toward the inner side in the radial direction from an upper part of the rectangular frame-shaped engaging portion 31. Two insertion portions 32 are formed from the engaging portion 31 and are spaced apart from each other. In addition, the insertion portions 32 and the engaging portion 31 are smoothly connected to each other by forming an R shape (curved shape) or the like. In addition, the insertion portions 32 come into contact with (the notch 27 of) the intermediate foil piece 10a and (the notch 26 of) the back foil piece 11a in the axial direction. That is, the insertion portions 32 come into contact with the notch 27 and the notch 26 in the axial direction. The barb portions 33 are formed to be curved in directions opposite to each other in the circumferential direction from tip parts of the insertion portions 32 that extend toward the inner side in the radial direction in parallel to each other. That is, the engagement member 30 includes a pair of barb portions 33 extending in the directions opposite to each other in the circumferential direction. The pair of barb portions 33 is housed in the groove portion 10c of the intermediate foil 10 and is positioned in the outer side in the radial direction than an opening position of the groove portion 10c (an upper end of the groove portion 10c at a position which is the same as the flat surface portion 10b in the radial direction).

On the inner peripheral side (inner side surface in the radial direction) of the intermediate foil 10 (back foil 11), the engagement member 30 of the present disclosure extends in the circumferential direction over a range wider than a formation range W of the notch 27 (the notch 26). Specifically, when a width between both end portions of the pair of barb portions 33 extending in opposite directions is set to W1, a relationship of W1>W is satisfied. When the width of the insertion portion 32 is set to W2, a relationship of W1>W>W2 is satisfied. In addition, when the width of the engaging portion 31 is set to W3, a relationship of W3>W1>W>W2 is satisfied. In addition, W1 extends in the circumferential direction over a wider range than the flat portion of the trough portion 11b of the back foil 11.

The engagement member 30 (engaging portion 31) is in contact with the inner surfaces 25a of the engaging groove 25 in a stored state (compressed state). The engagement member 30 of the present disclosure is formed by folding one leaf spring (elastic member) into a substantially C-shape (bottle shape). The engaging portions 31 of the engagement member 30 are engaged with the engaging groove 25 in a state of being slightly contracted in the circumferential direction. Accordingly, a springback that tends to open in the circumferential direction acts on the engaging portions 31. Accordingly, a frictional force is generated between the engaging portion 31 and the inner surface 25a of the engaging groove 25, and the engagement member 30 is held by the bearing housing 12.

Referring back to FIG. 3, the lid bodies 50 are attached to both of the end surfaces 12b of the bearing housing 12 in the axial direction. The lid body 50 covers the engaging groove 25 that house the engagement member 30. The lid body 50 of the present disclosure is forced in an annular plate shape along the circumferential direction of the bearing housing 2. The diameter of an inner peripheral edge of the lid body 50 is larger than the diameter of an inner peripheral edge of the hearing housing 12, and the diameter of an outer peripheral edge of the lid body 50 is smaller than the diameter of an outer peripheral edge of the bearing housing 12.

The lid body 50 is fastened by screws 51 which are screwed into screw holes 52 (refer to FIG. 2) formed in the vicinity of the engaging grooves 25. Each lid body 50 of the present disclosure is screwed at positions where the end surface 12b of the bearing housing 12 is almost divided in three in the circumferential direction of the bearing housing 12. In the configuration, since the lid body 50 that covers the engaging grooves 25 that house the engagement members 30 is attached to the end surface 12b of the bearing housing 12, the coming-off of the engagement me members 30 from the bearing housing 12 in the axial direction can be suppressed.

As illustrated in FIG. 6A, the bearing housing 12 is provided with a protrusion portion 40 that protrudes toward the inner side in the radial direction (inner diameter side) from the inner peripheral surface of the insertion hole 12a. The protrusion portion 40 of the present disclosure is formed integrally with the bearing housing 12. The protrusion portion 40 may be configured to be attached to the bearing housing 12 as a separate member. The protrusion portion 40 is formed in a ring shape along the circumferential direction of the inner peripheral surface of the insertion hole 12a. More specifically, the protrusion portion 40 is formed in a C-shape over substantially the entire periphery on the inner peripheral surface of the insertion hole 12a excluding the groove 13.

As illustrated in FIG. 6B, the protrusion portion 40 has a top wall portion 40a that is positioned (decreased in diameter) at the inner side in the radial direction than the inner peripheral surface of the insertion hole 12a and is flat along the circumferential direction and a pair of side wall portions 40b that is positioned at both ends of the top wall portion 40a in the axial direction and extends perpendicularly to the outer side in the radial direction toward the inner peripheral surface of the insertion hole 12a. The protrusion portion 40 includes the top wall portion 40a at a position in the axial direction within a range of ±5% from a middle position P1 in the axial direction of the insertion hole 12. That is, in a case where a full width of the insertion hole 12a (bearing housing 12) in the axial direction is set to D1 and a full width of the top wall portion 40a is set to D2. D2 may be formed within a range of 10% of D1. It does not mean that an effect does not occur unless D2 is formed within the range of 10% of D1.

As illustrated in FIG. 7, the back foil 11 of the present disclosure is separated in the axial direction of the insertion hole 12a. The back foil 11 (hereinafter, referred to as the first back foil 11) disposed on a first side (the upper side of the page of FIG. 7) in the axial direction with respect to the protrusion portion 40 has the notch 26 formed in an end edge on the first side in the axial direction, and the notch 26 is engaged with the engagement member 30. The notch 26 is not finned in an end edge of the first back foil 11 on a second side in the axial direction, and the end edge on the second side in the axial direction is in contact in the axial direction or is disposed with a slight gap with respect to the side wall portion 40b of the protrusion portion 40.

In addition, the back foil 11 (hereinafter, referred to as the second back foil 11) disposed on the second side (the lower side of the page of FIG. 7) in the axial direction with respect to the protrusion portion 40 also has the notch 26 formed in an end edge on the second side in the axial direction although not illustrated, and the notch 26 is engaged with the engagement member 30. The notch 26 is not formed at an end edge of the second back foil 11 on the first side in the axial direction, and the end edge on the first side in the axial direction is in contact in the axial direction or is disposed with a slight gap with respect to the side wall portion 40b of the protrusion portion 40.

That is, the back foil 11 includes four end edges (two end edges of the first back foil 11 and two end edges of the second back foil 11) that extend in a direction intersecting the axial direction with the protrusion portion 40 interposed therebetween. Alternatively, it can be said that the back foil 11 has four end edges when seen in the axial direction. In addition, the notch 26 is formed in end edges of the hack foil 11 on the outer side (both sides) in the axial direction, and is engaged with the engagement member 30. On the other hand, the notch 26 is not formed in end edges of the back foil 11 that face the protrusion portion 40, that is, two end edges positioned on the inner side in the axial direction, and the two end edges are in contact in the axial direction or are disposed with a slight gap with respect to the side wall portions 40b of the protrusion portion 40.

In addition, the intermediate foil 10 of the present disclosure is also separated from the protrusion portion 40 in the axial direction of the insertion hole 12a. The intermediate foil 10 (hereinafter, referred to as the first intermediate foil 10) disposed on the second side (the lower side of the page of FIG. 7) in the axial direction with respect to the protrusion portion 40 has the notch 27 formed in an end edge on the second side in the axial direction, and the notch 27 is engaged with the engagement member 30. The notch 27 is not formed in an end edge of the first intermediate foil 10 on the first side in the axial direction, and the end edge on the first side in the axial direction is in contact in the axial direction or is disposed with a slight gap with respect to the side wall portion 40b of the protrusion portion 40.

In addition, the intermediate foil 10 (hereinafter, referred to as the second intermediate foil 10) disposed on the first side (the upper side of the page of FIG. 7) in the axial direction with respect to the protrusion portion 40 has the notch 27 formed in an end edge on the first side in the axial direction although not illustrated, and the notch 27 is engaged with the engagement member 30. The notch 27 is not formed in the end edge of the second intermediate foil 10 on the second side in the axial direction, and the end edge on the second side in the axial direction is in contact in the axial direction or is disposed with a slight gap with respect to the side wall portion 40b of the protrusion portion 40.

That is, the intermediate foil 10 includes four end edges (two end edges of the first intermediate foil 10 and two end edges of the second intermediate foil 10) that extend in the direction intersecting the axial direction with the protrusion portion 40 interposed therebetween. Alternatively, it can be said that the intermediate foil 10 has four end edges when seen in the axial direction. In addition, the notch 26 is formed in end edges of the intermediate foil 10 on the outer side (both sides) in the axial direction, and is engaged with the engagement member 30. On the other hand, the notch 26 is not formed in end edges of the intermediate foil 10 that face the protrusion portion 40, that is, two end edges positioned on the inner side in the axial direction, and the two end edges are in contact in the axial direction or are disposed with a slight gap with respect to the side wall portions 40b of the protrusion portion 40.

As illustrated in FIG. 9, the top foil 9 is supported by each of the back foil 11 and the intermediate foil 10, which are separated in the axial direction of the insertion hole 12a. A gap is formed between the separated first and second back foils 11 and between the separated first and second intermediate foils 10, and the protrusion portion 40 is disposed in the gap. That is, parts on both sides of the back foil 11 and the intermediate foil 10 between which the protrusion portion 40 is interposed support the top foil 9, respectively. That is, the top wall portion 40a faces the top foil 9 in the radial direction. The top foil 9 is disposed to overlap the protrusion portion 40 in the radial direction of the insertion hole 12a (an up-and-down direction of the page of FIG. 9). The top wall portion 40a of the protrusion portion 40 faces the outer peripheral surface (back surface) of the top foil 9 with a gap in the radial direction of the insertion hole 12a.

As illustrated in FIG. 8, the protrusion portion 40 extends from the inner peripheral surface of the insertion hole 12a to a radial position on the outer side in the radial direction (outer diameter side) than a top portion 11c1 of the crest portion 11c of the back foil 11. That is, the protrusion portion 40 does not protrude toward the inner side in the radial direction (inner diameter side) than the top portion 11c1 of the crest portion 11c. For this reason, in a case where no load acts on, the top wall portion 40a of the protrusion portion 40 is spaced apart from the outer peripheral surface of the top foil 9. The protrusion portion 40 (top wall portion 40a) may have, for example, a height of 75% or less of the full height of the crest portion 11c.

The protrusion portion 40 extends to a radial position on the inner side in the radial direction (inner diameter side) with respect to the trough portion 11b of the back foil 11. Accordingly, as illustrated in FIG. 7, a part of the end edge of the back foil 11 facing the protrusion portion 40 can face the side wall portion 40b, and the back foil 11 is positioned in the axial direction. In addition, the protrusion portion 40 may extend to a radial position on the inner side in the radial direction (inner diameter side) than the groove portion 10c of the intermediate foil 10. Accordingly, a part of the end edge of the intermediate foil 10 facing the protrusion portion 40 can face the side wall portion 40b, and the intermediate foil 10 is positioned in the axial direction.

As illustrated in FIG. 8, the intermediate foil 10 of the present disclosure includes second groove portions 10c1 on both sides in the circumferential direction of the groove portion 10c, which is at a middle position in the circumferential direction. The second groove portions 10c1 are recessed to the outer side in the radial direction similar to the groove portion 10c, and are spaced apart from the top toil 9.

The second groove portions 10c1 come into contact with the crest portions 11c of the back foil 11 and make it easier to cause energy dissipation due to friction to be described later. In addition, the second groove portions 10c1 face the side wall portion 40b of the protrusion portion 40 in the axial direction and contribute to the positioning of the intermediate foil 10 in the axial direction. That is, the second groove portions 10c1 extend to the outer side in the radial direction than the top wall portion 40a.

Next, the operation of the radial foil bearing 3 including such a configuration will be described.

In a state where the rotary shaft 1 is stopped, the top foil 9 is biased toward a rotary shall 1 side by the back foil 11 (three back foil pieces 11a) via an intermediate foil 10 (three intermediate foil pieces 10a) to be brought into close contact with the rotary shaft 1. In the present disclosure, since both end portions of the top foil 9 are the thin wall portions 24, a force (local preload) for tightening the rotary shaft 1 in the thin wall portions 24 is alleviated compared to a case where there is no thin wall portion 24.

Then, when the rotary shaft 1 is rotated in an arrow P direction in FIG. 2, the rotary shaft starts to rotate at a low speed initially, and then gradually accelerates to rotate at a high speed. Then, as indicated with an arrow Q in FIG. 2, an ambient fluid is drawn in from one end side of each of the top foil 9, the intermediate foil 10, and the back foil 11, and flows into a space between the top foil 9 and the rotary shaft 1. Accordingly, a fluid lubrication film is formed between the top foil 9 and the rotary shaft 1.

A film pressure of the fluid lubrication film acts on the top foil 9, and each of the crest portions 11c of each back foil piece 11a are pressed via the intermediate foil 10 which is in contact with the top foil 9. Then, as the back foil piece 11a is pressed by the intermediate foil 10, the crest portions 11c of the back foil piece 11a are pressed and spread. Consequently, the back foil piece 11a is about to move on the bearing housing 12 in the circumferential direction of the back foil piece 11a. That is, since the back foil piece 11a (back foil 11) elastically supports the top foil 9 via the intermediate foil 10, the back foil piece 11a allows the top foil 9 and the intermediate foil 10 to bend by deforming in the circumferential direction of the back foil piece 11a when a load is received from the top foil 9, thereby supporting the top foil 9 and the intermediate foil 10.

Herein as illustrated in FIG. 8, the engagement member 30 (insertion portion 32) is inserted in the notch 26 formed in the end edge of the back foil piece 11a in the axial direction. As the engagement member 30 is engaged with the engaging groove 25 of the bearing housing 12 and the engagement member 30 is inserted into the notch 26, the rotation of the back foil piece 11a in the circumferential direction is suppressed. Therefore, each of the crest portions 11c of each of the back foil pieces 11a deform (move) in the circumferential direction with the notch 26, with which the engagement member 30 is engaged, interposed therebetween.

The insertion portions 32 of the engagement member 30 are in contact with (the notch 26 of) the back foil piece 11a, and also suppress the movement of the back foil piece 11a in the axial direction. That is, the insertion portions 32 of the engagement member 30 are in contact with the notch 26, and also suppress the movement of the back foil piece 11a in the axial direction. Further, on the inner peripheral side of the back foil 11 that has passed through the notch 26, the engagement member 30 (barb portion 33) extends to the outside of the formation range W of the notch 26 in the circumferential direction of the insertion hole 12a. That is, the engagement member 30 has the barb portions 33 formed on the inner peripheral side of the back foil 11 that has passed through the notch 26, and this retains the back foil piece 11a in the radial direction. Accordingly, the coming-off of the back foil piece 11a is suppressed.

Similar to the back foil piece 11a, the notch 27 is also formed in the intermediate foil piece 10a, and the engagement member 30 is inserted therein. For this reason, the coming-off of the intermediate foil piece 10a is also suppressed. When a load is transmitted from the top foil 9 to the back foil piece 11a, the intermediate foil piece 10a bends together with the top foil 9 and the back foil piece 11a, but "slip" occurs between the intermediate foil piece 10a and the top foil 9 or the back foil piece 11a at the time. That is, when pressure fluctuations occur in the fluid lubrication film due to shaft vibration of the rotary shaft 1, the pressure fluctuations are transmitted to the top foil 9 and the "slip" occurs. Since this "slip" causes energy dissipation due to friction and attenuates film pressure fluctuations, the shaft vibration of the rotary shaft 1 is suppressed.

In addition, when a fluctuating load (repetition of loading and unloading) due to the shaft vibration of the rotary shaft 1 acts on the back foil piece 11a and the load is on an unloading side, the back foil piece 11a slightly rises from the inner peripheral surface of the insertion hole 12a of the bearing housing 12. At this time, the barb portions 33 of the engagement member 30 are hooked onto the back foil piece 11a (intermediate foil piece 10a), and the engagement member 30 is lifted together with the back foil piece 11a. Herein, since the engagement member 30 is in contact with the inner surfaces 25a of the engaging groove 25 of the bearing housing 12, "slip" occurs between the engagement member 30 and the inner surfaces 25a of the engaging groove 25, causing energy dissipation due to friction and contributing as attenuation. At this time, since the bearing housing 12 is stationary, the rise and "slip" described above may be considered as relative movement with respect to the stationary bearing housing 12.

During such normal operation, a load acting on the rotary shaft 1 presses down the top foil 9 via the fluid lubrication film, and the back foil 11 supports the top foil 9, as illustrated in FIG. 9. When a bearing load increases due to a strong external force, the back foil 11 is further pressed down, and the outer diameter side (back side) of the top foil 9 starts to come into contact with the top wall portion 40a of the protrusion portion 40. When this state is reached, even if the bearing load increases, the increased load is supported by the protrusion portion 40, and a progress in the displacement of the rotary shaft 1 in the radial direction reaches a peak. Therefore, the tip clearance 7 between the impeller 2 and the housing 6 illustrated in FIG. 1 is maintained, and contact therebetween can be avoided. In addition, conversely, the tip clearance 7 can be designed to be narrow to increase the efficiency of the turbomachine.

In a case where the outer diameter side of the top foil 9 is not in contact with the top wall portion 40a of the protrusion portion 40 (or in a case where there is no protrusion portion 40), the pressure of the fluid lubrication film (shown with arrows in FIG. 9) significantly bends the top foil 9 near the middle of the insertion hole 12a in the axial direction. As described above, when the top foil 9 bends near the middle of the insertion hole 12a in the axial direction, the fluid lubrication film becomes thicker. Thus, the pressure of the fluid lubrication film becomes weak. On the other hand, in the present disclosure, when the displacement of the rotary shaft 1 in the radial direction progresses and the outer diameter side of the top foil 9 starts to come into contact with the top wall portion 40a of the protrusion portion 40, a force supporting the top foil 9 becomes stronger. Therefore, the bending of the top foil 9 near the middle of the insertion hole 12a in the axial direction decreases. Then, even when the displacement of the rotary shaft 1 in the radial direction is slightly increased, the pressure in the fluid lubrication film rises significantly, and an even larger bearing load can be supported. That is, as the displacement of the rotary shaft 1 in the radial direction progresses, the fluid lubrication film also strengthens.

In addition, as illustrated in FIG. 6B, the protrusion portion 40 of the present disclosure includes the top wall portion 40a at a position in the axial direction within a range of ±5% from the middle position P1 in the axial direction of the insertion hole 12a. Therefore, the bending of the top foil 9 near the middle of the insertion hole 12a in the axial direction can be effectively suppressed. That is, as illustrated in FIG. 9, the pressure of the fluid lubrication film reaches a peak near the middle in the axial direction and decreases toward both ends in the axial direction. That is, the rate of change in the pressure of the fluid lubrication film increases from the near the middle in the axial direction toward both ends in the axial direction. The support by the top wall portion 40a may be near the peak of the fluid lubrication film. In the range of ±5% from the middle position P1 in the axial direction illustrated in FIG. 6B, the pressure does not significantly change compared to a peak pressure of the fluid lubrication film, and the support by the top wall portion 40a acts more effectively.

In addition, as illustrated in FIG. 6A, since the protrusion portion 40 of the present disclosure is formed in a ring shape along the circumferential direction of the inner peripheral surface of the insertion hole 12a, the bending of the top foil 9 near the middle of the insertion hole 12a in the axial direction can be suppressed over the entire periphery. Further, as illustrated in FIG. 7, since the back foil 11 (intermediate foil 10) is separated in the axial direction of the insertion hole 12a, the back foil 11 can be disposed on the inner peripheral surface of the insertion hole 12a without interfering with the protrusion portion 40 formed in a ring shape.

As described above, in the present disclosure described above, by adopting a configuration where the bearing housing 12 that has the insertion hole 12a into which the rotary shaft 1 is inserted, the back foil 11 that is disposed on the inner peripheral surface of the insertion hole 12a and includes the crest portion 11c and the trough portion 11b alternately along the circumferential direction of the inner peripheral surface, the intermediate foil 10 that is supported by the back foil 11, the top foil 9 that is supported by the intermediate foil 10, and the protrusion portion 40 that is disposed to overlap the top foil 9 in the radial direction of the insertion hole 12a and extends from the inner peripheral surface of the insertion hole 12a to a radial position on the outer side in the radial direction than the top portion 11c1 of the crest portion 11c are included, the displacement of the rotary shaft 1 in the radial direction can be suppressed when a large external force has acted on the turbomachine into which the radial foil bearing 3 is incorporated.

Second Embodiment

Next, a second embodiment of the present disclosure will be described. In the following description, configurations which are the same or equivalent to the embodiment described above will be assigned with the same reference signs, and a description thereof will be simplified or omitted.

Figure 10:
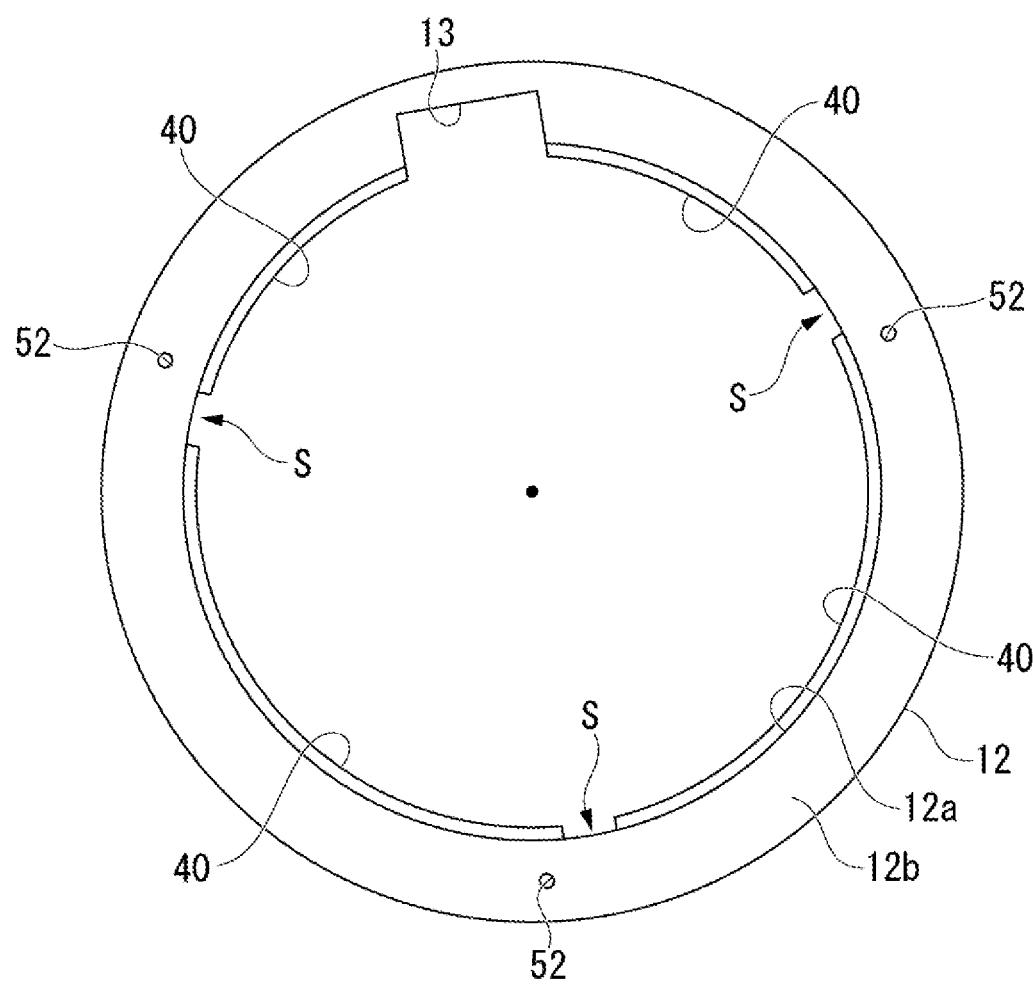
FIG. 10 is a front view of a bearing housing according to a second embodiment of the present disclosure.
Figure 11:
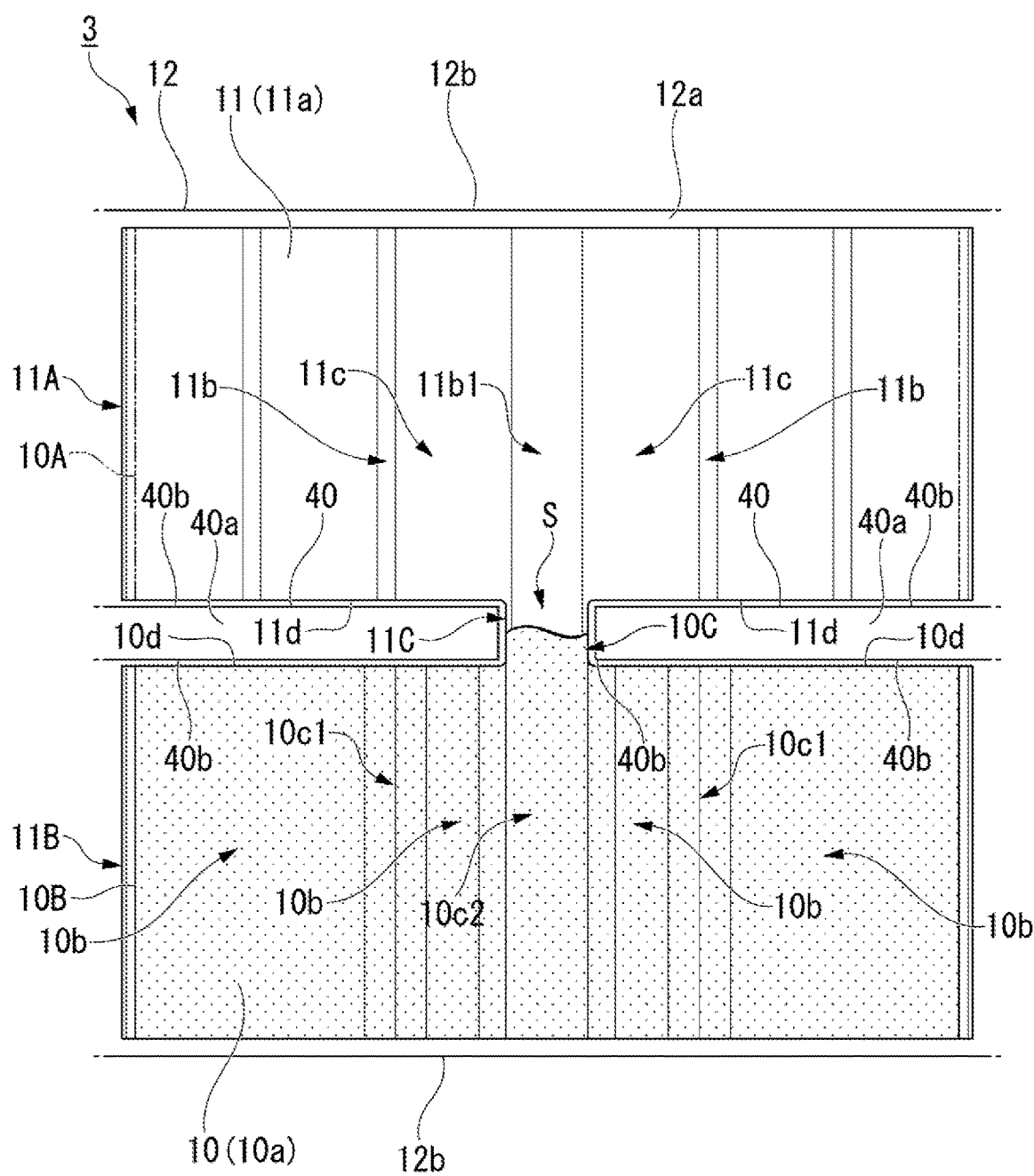
FIG. 11 is a plan view schematically illustrating flattened main portions of a radial foil bearing according to the second embodiment of the present disclosure.
Figure 12:
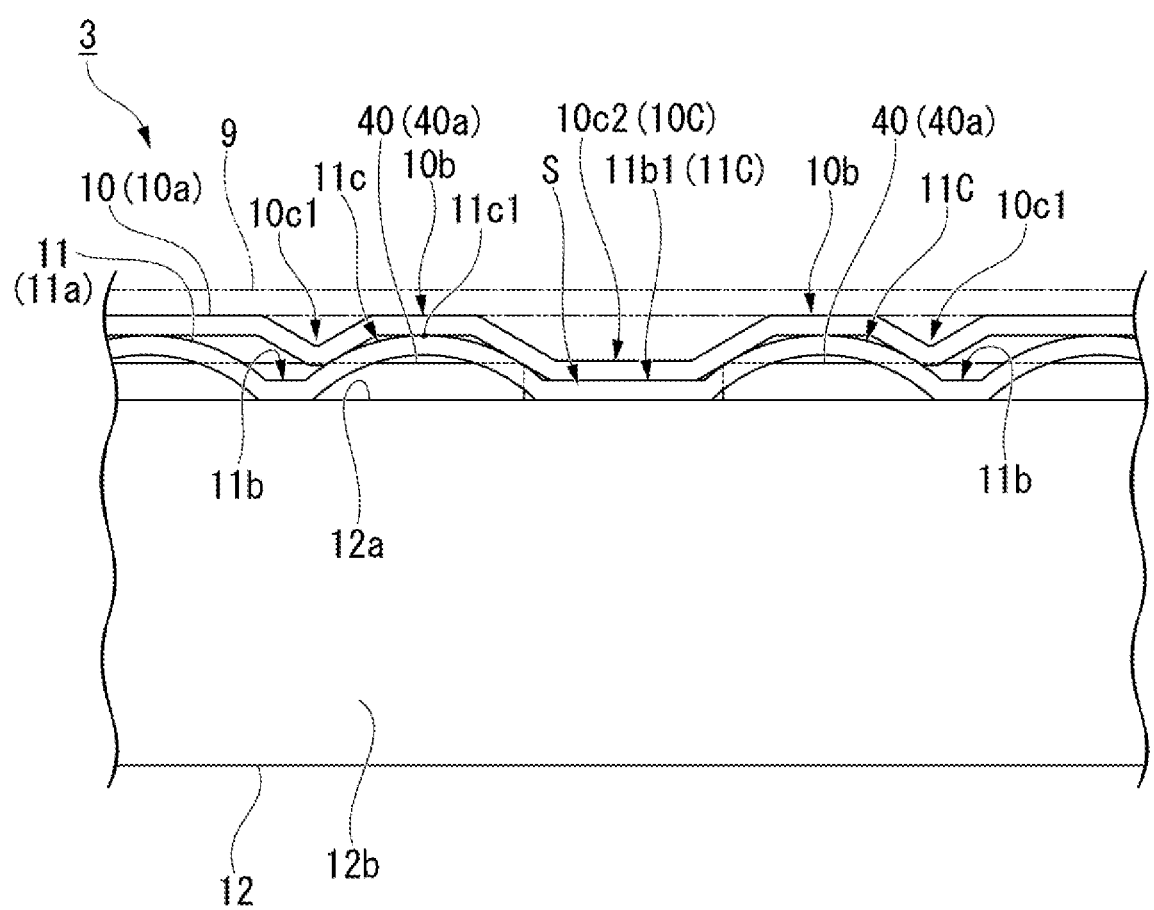
FIG. 12 is a from view schematically illustrating the flattened main portions of the radial foil bearing according to the second embodiment of the present disclosure.

FIG. 10 is a front view of the bearing housing 12 according to the second embodiment of the present disclosure. FIG. 11 is a plan view schematically illustrating flattened main portions of the radial foil bearing 3 according to the second embodiment of the present disclosure. FIG. 12 is a front view schematically illustrating the flattened main portions of the radial foil bearing 3 according to the second embodiment of the present disclosure.

The second embodiment is different from the first embodiment in that the plurality of protrusion portions 40 are formed with a gap (interval) along the circumferential direction of the inner peripheral surface of the insertion hole 12a as illustrated in FIG. 10.

A gap S in the circumferential direction is formed between the protrusion portion 40 and the protrusion portion 40 adjacent thereto in the circumferential direction. The gap S is formed at each of positions where the inner peripheral surface of the insertion hole 12a is almost divided in three in the circumferential direction. In the present disclosure, the groove 13 is disposed between two gaps S out of the three gaps S. In addition, one of the gaps S faces the groove 13 in the radial direction.

As illustrated in FIG. 11, the back foil 11 includes a first support portion 11A that is disposed on the first side (an upper side of the page of FIG. 11) in the axial direction with respect to the plurality of protrusion portions 40, a second support portion 11B that is disposed on the second side (a lower side of the page of FIG. 11) in the axial direction with respect to the plurality of protrusion portions 40, and a connecting portion 11C that is disposed in the gap S between the protrusion portion 40 and the protrusion portion 40 and connects the first support portion 11A to the second support portion 11B. That is, the back foil 11 is not separated in the axial direction of the insertion hole 12a.

The connecting portion 11C connects circumferentially middle positions of the first support portion 11A and the second support portion 11B to each other. At the circumferentially middle positions of the first support portion 11A and the second support portion 11B, there are second trough portions 11b1 which are in contact with the inner peripheral surface of the insertion hole 12a as illustrated in FIG. 12. A flat portion of the second trough portion 11b1 is larger than the width of the flat portion of another trough portion 11b and is smaller than the width of the gap S. As illustrated in FIG. 11, hole portions 11d (notches) extending in the circumferential direction are formed on both sides of the connecting portion 11C in the circumferential direction. The hole portions 11d are formed at positions corresponding to the protrusion portions 40.

That is, there is a recess extending in the circumferential direction at an axially middle position of both end edges of the back foil 11 (back foil piece 11a) in the circumferential direction.

Also the intermediate foil 10 includes a first support portion 10A that is disposed on the first side (the upper side of the page of FIG. 11) in the axial direction with respect to the plurality of protrusion portions 40, a second support portion 10B that is disposed on the second side (the lower side of the page of FIG. 11) in the axial direction with respect to the plurality of protrusion portions 40, and a connecting portion 10C that is disposed in the gap S between the protrusion portion 40 and the protrusion portion 40 and connects the first support portion 10A to the second support portion 10B. That is, also the intermediate foil 10 is not separated in the axial direction of the insertion hole 12a.

The connecting portion 10C connects circumferentially middle positions of the first support portion 10A and the second support portion 10B to each other. At each of the circumferentially middle positions of the first support portion 10A and the second support portion 10B, there is a third groove portion 10c2 which is in contact with the second trough portion 11b1 as illustrated in FIG. 12. A flat portion of the third groove portion 10c2 is smaller than the width of the flat portion of the second trough portion 11b 1 and is smaller than the width of the gap S. As illustrated in FIG. 11, hole portions 10d (notches) are formed on both sides of the connecting portion 10C in the circumferential direction. The hole portions 10d are formed at positions corresponding to the protrusion portions 40. That is, there is a recess extending in the circumferential direction at an axially middle position of both end edges of the intermediate foil 10 intermediate foil piece 10a) in the circumferential direction.

In the second embodiment having the configuration, the back foil 11 (intermediate foil 10) does not have to be separated in the axial direction as the gap S is formed between the protrusion portion 40 and the protrusion portion 40. Accordingly, the number of components reduces. In addition, as illustrated in FIG. 11, since the back foils 11 (intermediate foils 10) are positioned by the protrusion portion 40 on both sides in the axial direction and both sides in the circumferential direction, the engagement member 30, the notch 26 (notch 27), and even the lid body 50, which are illustrated in FIG. 7, are unnecessary. Therefore, the number of components is greatly reduced.

Figure 13:
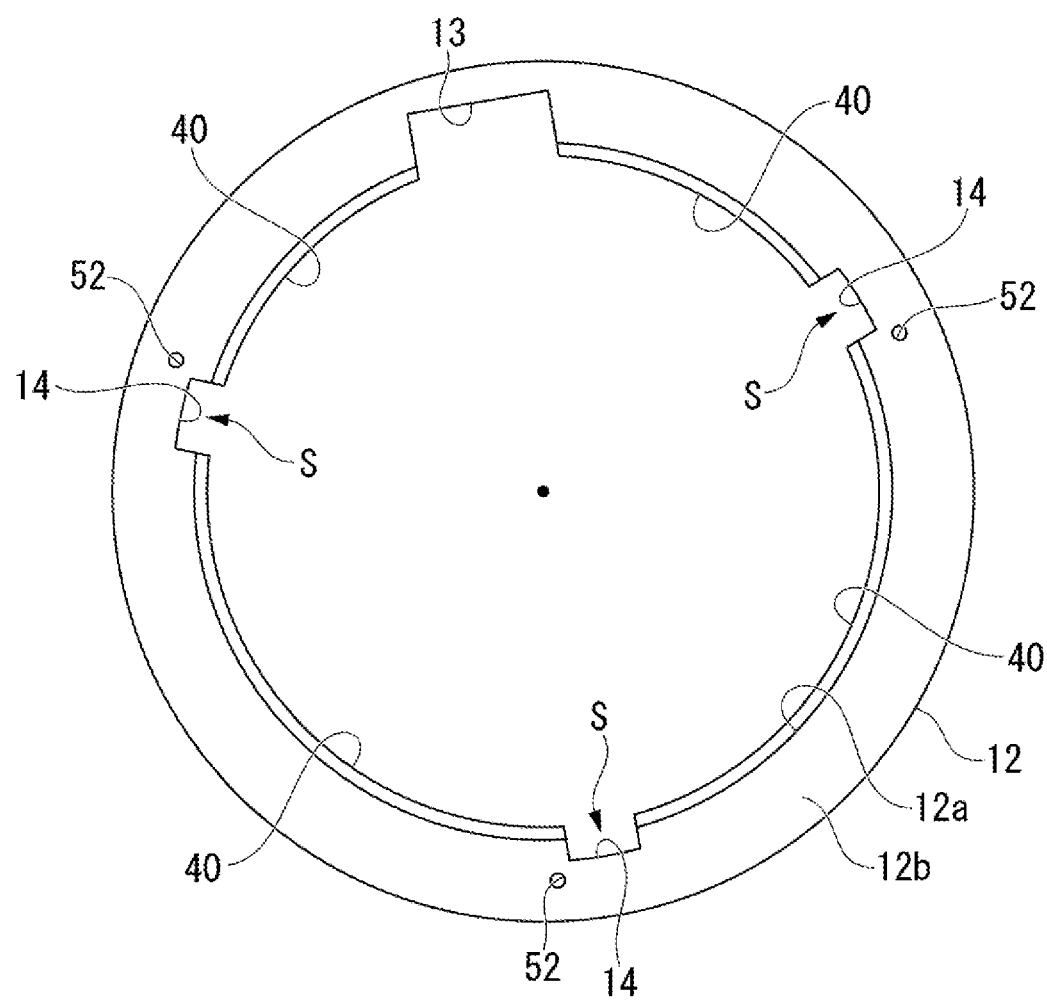
FIG. 13 is a front view of a bearing housing according to a modification example of the second embodiment of the present disclosure.
Figure 14:
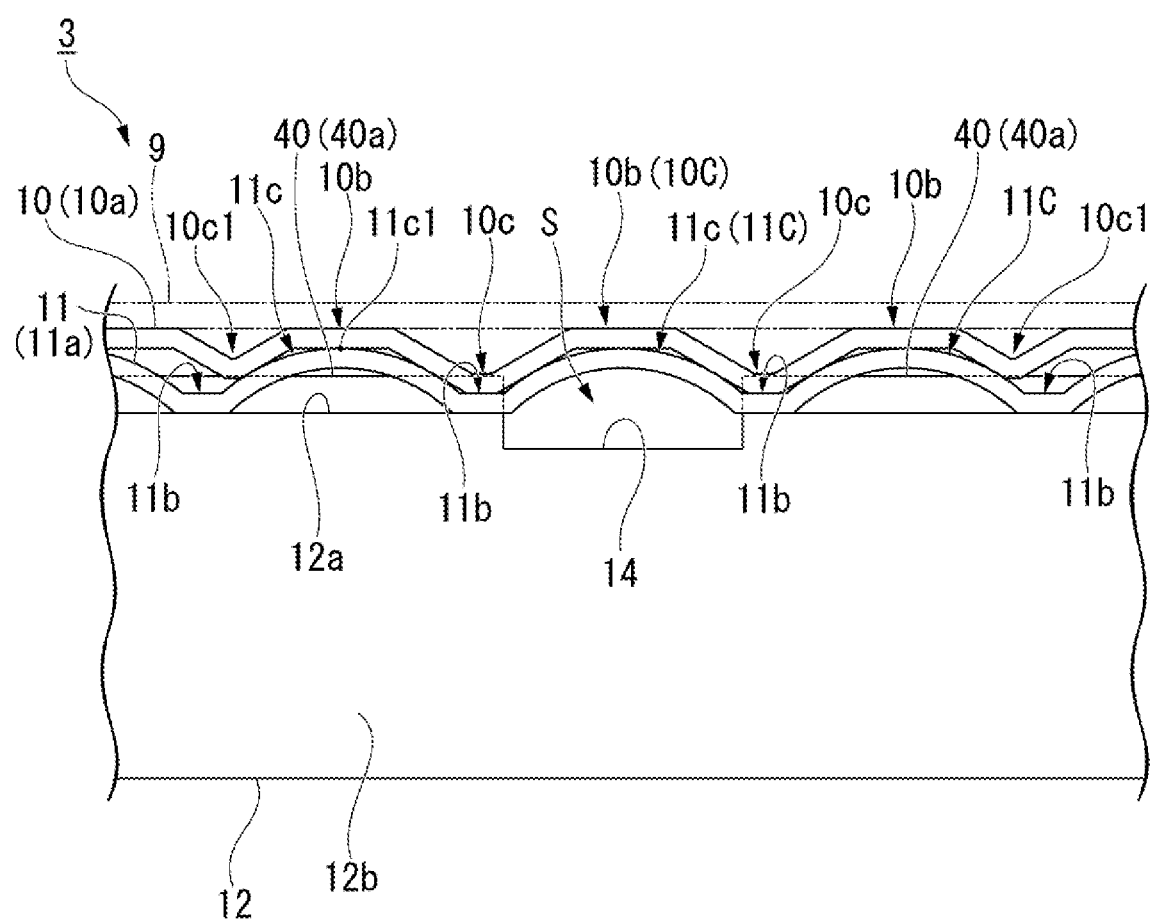
FIG. 14 is a front view schematically illustrating flattened main portions of a radial foil bearing according to the modification example of the second embodiment of the present disclosure.

In the second embodiment, a modification example illustrated in FIGS. 13 and 14 can be adopted.

FIG. 13 is a front view of the bearing housing 12 according to a modification example of the second embodiment of the present disclosure. FIG. 14 is a front view schematically illustrating flattened main portions of the radial foil bearing 3 according to the modification example of the second embodiment of the present disclosure.

As illustrated in FIG. 13, a groove 14 is formed in the insertion hole 12a at a position corresponding to the gap S between the protrusion portion 40 and the protrusion portion 40. The groove 14 is a recess that is recessed to the outer side in the radial direction than the inner peripheral surface of the insertion hole 12a, and can be formed through, for example, key groove processing.

As illustrated in FIG. 14, the back foil 11 includes the crest portion 11c at the circumferentially middle position above the groove 14. In addition, the intermediate foil 10 includes the flat surface portion 10b at the circumferentially middle position above the groove 14. A planar shape of the back foil 11 (intermediate foil 10) is substantially the same as the planar shape illustrated in FIG. 11. In the configuration, the plurality of protrusion portions 40 can be easily formed by shaving off the ring shaped protrusion portion 40 through key groove processing or the like, and the back foil 11 (intermediate foil 10) can be disposed across the groove 14 formed through the processing.

Figure 15:
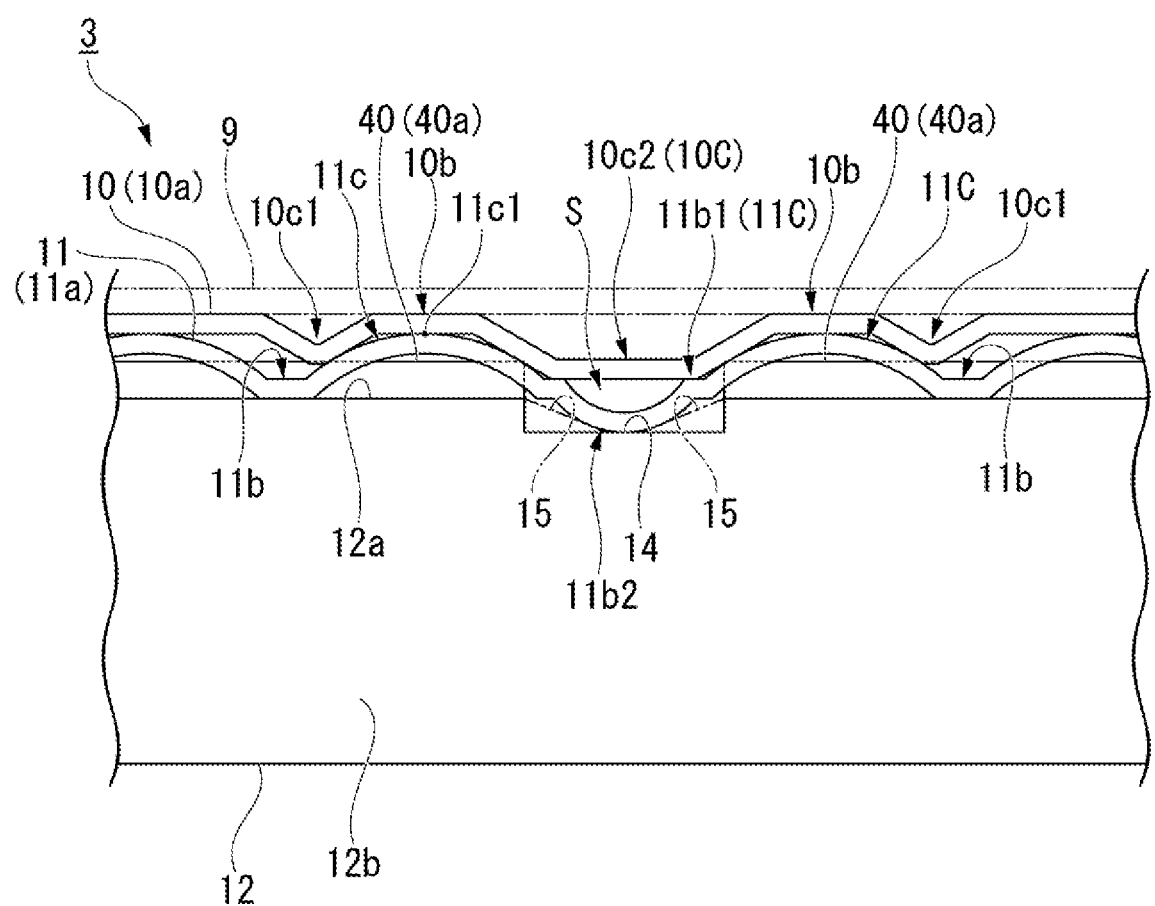
FIG. 15 is a front view schematically illustrating flattened main portions of a radial foil bearing according to a modification example of the second embodiment of the present disclosure.

In the second embodiment, a modification example illustrated in FIG. 15 can also be adopted.

FIG. 15 is a front view schematically illustrating flattened main portions of the radial foil bearing 3 according to the modification example of the second embodiment of the present disclosure.

As illustrated in FIG. 15, the back foil 11 includes a second crest portion 11b2 that is the crest portion 11c reversed up and down at the second trough portion 11b1, which is at the circumferentially middle position above the groove 14. A top portion of the second crest portion 11b2 on the outer side in the radial direction is in contact with a bottom surface of the groove 14. By making the bottom sat face of the groove 14 into a tapered surface indicated with the reference sign 15 (that is, a wedge shape that narrows toward the outer side in the radial direction), the second crest portion 11b2 fits better.

Although the two embodiments and modification examples of the present disclosure have been described hereinbefore with reference to the drawings, the present disclosure is not limited to the embodiments and the modification examples. Various shapes and combinations of each component presented in the embodiments described above are merely examples, and a variety of changes can be made based on design requirements without departing from the scope of the present disclosure defined in claims.

Figure 16:
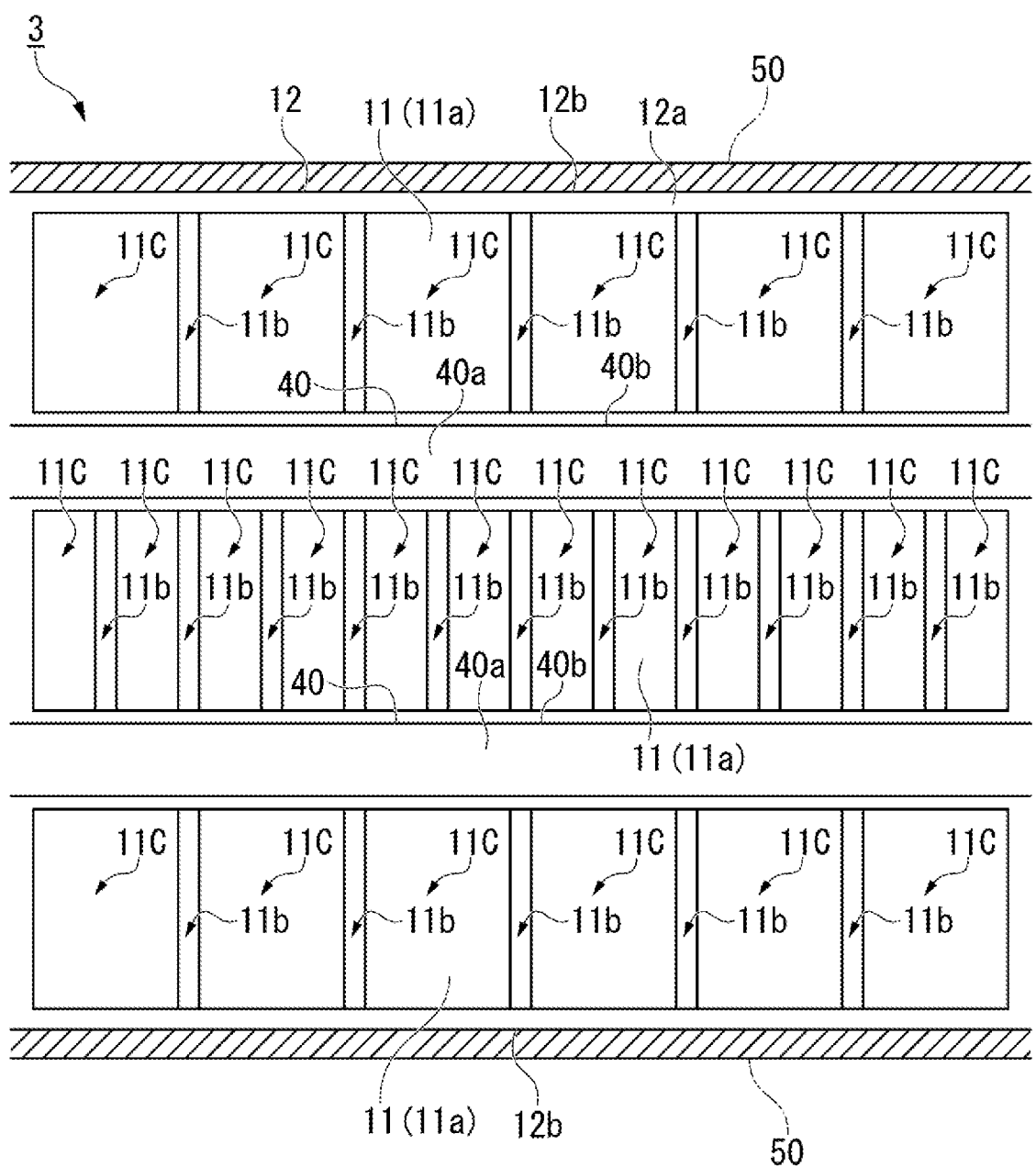
FIG. 16 is a front view schematically illustrating flattened main portions of a radial foil bearing according to a modification example of the first embodiment of the present disclosure.

For example, in the first embodiment, the ring-shaped protrusion portions 40 may be provided in a plurality of rows. In addition, the first and second back foils separated in the axial direction of the insertion hole 12a by the ring-shaped protrusion portion 40 may have different support stiffness for supporting the top foil 9. For example, as illustrated in FIG. 16, in a case where the ring-shaped protrusion portions 40 are provided in two rows spaced apart from each other in the axial direction, a pitch between the crest portion 11c and the trough portion 11b of the middle first back foil 11 disposed between the two rows of protrusion portions 40 may be narrower than a pitch between the crest portion 11c and the trough portion 11b of the outer side second back foil 11 disposed at the outer side in the axial direction than the two rows of protrusion portions 40. FIG. 16 illustrates an example in which the pitch between the crest portion 11c and the trough portion 11b of the middle first back foil 11 disposed between the two rows of protrusion portions 40 is approximately half the pitch between the crest portion 11c and the trough portion 11b of the outer side second back foil 11 disposed in the outer side in the axial direction than the two rows of protrusion portions 40. In order to describe a case where the first and second back foils 11 have different support stiffness for supporting the top foil 9, illustration is presented with the engagement member 30, the notch 26, the engaging groove 25 omitted for simplification as illustrated in FIG. 16. Accordingly, since the stiffness of the back foil 11 disposed at an axially middle portion increases, the bending of the top foil 9 near the axially middle can be effectively suppressed. Mere are various methods of changing the support stiffness, and for example, a material, a thickness, a pitch width, the width of a single crest (a bubble diameter in a case of bubble-like bump foil), and the height of a crest (bubble) may be changed depending on the case.

In addition, in the second embodiment, the plurality of protrusion portions 40 may be scattered on the inner peripheral surface of the insertion hole 12a. In addition, the hole portions 11d formed at positions corresponding to the protrusion portions 40 of the back foil 11 may be through-holes instead of notches (recesses).

INDUSTRIAL APPLICABILITY

In the radial foil bearing of the present disclosure, the displacement of the shaft can be suppressed when a large external force acts on the device.

What is claimed is:

1. A radial foil bearing comprising:
a bearing housing that has an insertion hole into which a shaft is to be inserted;
a back foil that is disposed on an inner peripheral surface of the insertion hole;
a top foil that is supported by the back foil; and
a protrusion portion that protrudes toward an inner side in a radial direction of the insertion hole from the inner peripheral surface of the insertion hole and is configured to allow supporting of the top foil in the radial direction of the insertion hole,
wherein
the back foil includes four end edges that extend in a direction intersecting an axial direction of the insertion hole with the protrusion portion interposed therebetween, and
the protrusion portion and the bearing housing are formed of one-piece.

2. The radial foil bearing according to claim 1, wherein the back foil includes a hole portion to which the protrusion portion is fitted.

3. The radial foil bearing according to claim 2, wherein the protrusion portion includes a top wall portion at a position in the axial direction within a range of ±5% from a middle position in the axial direction of the insertion hole.

4. The radial foil bearing according to claim 3, wherein the protrusion portion is formed in a ring shape along a circumferential direction of the inner peripheral surface of the insertion hole.

5. The radial foil bearing according to claim 3, wherein a plurality of the protrusion portions are formed with a gap along a circumferential direction of the inner peripheral surface of the insertion hole.

6. The radial foil bearing according to claim 2, wherein the protrusion portion is formed in a ring shape along a circumferential direction of the inner peripheral surface of the insertion hole.

7. The radial foil bearing according to claim 2, wherein a plurality of the protrusion portions are formed with a gap along a circumferential direction of the inner peripheral surface of the insertion hole.

8. The radial foil bearing according to claim 1, wherein the protrusion portion includes a top wall portion at a position in the axial direction within a range of ±5% from a middle position in the axial direction of the insertion hole.

9. The radial foil bearing according to claim 8, wherein the protrusion portion is formed in a ring shape along a circumferential direction of the inner peripheral surface of the insertion hole.

10. The radial foil bearing according to claim 8, wherein a plurality of the protrusion portions are formed with a gap along a circumferential direction of the inner peripheral surface of the insertion hole.

11. The radial foil bearing according to claim 8, wherein
the back foil includes a first back foil and a second back foil, which are separated in the axial direction of the insertion hole, and
the first back foil and the second back foil face each other in the axial direction with the protrusion portion interposed therebetween.

12. The radial foil bearing according to claim 1, wherein the protrusion portion is formed in a ring shape along a circumferential direction of the inner peripheral surface of the insertion hole.

13. The radial foil bearing according to claim 12, wherein
the back foil includes a first back foil and a second back foil, which are separated in the axial direction of the insertion hole, and
the first back foil and the second back foil face each other in the axial direction with the protrusion portion interposed therebetween.

14. The radial foil bearing according to claim 1, wherein a plurality of the protrusion portions are formed with a gap along a circumferential direction of the inner peripheral surface of the insertion hole.

15. The radial foil bearing according to claim 14, wherein the back foil includes
   a first support portion that is disposed on a first side in the axial direction with respect to the protrusion portions,
   a second support portion that is disposed on a second side in the axial direction with respect to the protrusion portions, and
   a connecting portion that is disposed in the gap and connects the first support portion and the second support portion to each other.

16. The radial foil bearing according to claim 1, wherein the back foil includes a first back foil and a second back foil, which are separated in the axial direction of the insertion hole, and
   the first back foil and the second back foil face each other in the axial direction with the protrusion portion interposed therebetween.

17. The radial foil bearing according to claim 16, wherein the first back foil and the second back foil have different support stiffness for supporting the top foil.

* * * * *